US012760786B2

(12) United States Patent
Lee et al.

(10) Patent No.: US 12,760,786 B2
(45) Date of Patent: Oct. 13, 2026

(54) DISPLAY DEVICE

(71) Applicant: LG ELECTRONICS INC., Seoul (KR)

(72) Inventors: Myungho Lee, Seoul (KR); Kwaneun Jin, Seoul (KR); Jonggil Pyo, Seoul (KR); Chulki Kim, Seoul (KR); Deugjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 18/880,249

(22) PCT Filed: Jul. 5, 2022

(86) PCT No.: PCT/KR2022/009635
§ 371 (c)(1),
(2) Date: Dec. 30, 2024

(87) PCT Pub. No.: WO2024/010104
PCT Pub. Date: Jan. 11, 2024

(65) Prior Publication Data

US 2026/0009452 A1 Jan. 8, 2026

(51) Int. Cl.
*F16H 7/20* (2006.01)
*F16H 7/02* (2006.01)
*G06F 1/16* (2006.01)

(52) U.S. Cl.
CPC ................. *F16H 7/20* (2013.01); *F16H 7/02* (2013.01); *G06F 1/1601* (2013.01)

(58) Field of Classification Search
CPC ............. G06F 1/1601; F16H 7/02; F16H 7/20
See application file for complete search history.

(56) References Cited

U.S. PATENT DOCUMENTS 6,831,829 B2 * 12/2004 Einhorn ............... A47B 81/064 361/679.21
10,410,549 B1 * 9/2019 Kim ...................... G06F 1/1652
(Continued)

FOREIGN PATENT DOCUMENTS

JP 2013231751 11/2013
KR 101573057 11/2015
(Continued)

OTHER PUBLICATIONS

PCT International Application No. PCT/KR2022/009635, International Search Report dated Feb. 8, 2023, 2 pages.

*Primary Examiner* — Michael Pervan
(74) *Attorney, Agent, or Firm* — LEE, HONG, DEGERMAN, KANG & WAIMEY

(57) ABSTRACT

A display device is provided. The display device of the present disclosure includes: a display panel; a frame including a first frame disposed adjacent to a first side of the display panel, and a second frame disposed adjacent to a second side of the display panel; and a driving module configured to move the display panel in a direction in which the first frame and the second frame are spaced apart from each other, wherein the driving module includes: a roller coupled to the first frame; a pulley coupled to the second frame; a motor configured to provide torque to the roller; and a belt having a first end fixed to the roller and a second end fixed to the display panel, wherein the belt is stretched over the pulley at a position between the first end and the second end of the belt.

14 Claims, 18 Drawing Sheets

(56) References Cited

U.S. PATENT DOCUMENTS

| | | | | |
|---|---|---|---|---|
| 10,769,971 | B2 * | 9/2020 | Kim | G09F 9/301 |
| 11,430,353 | B2 * | 8/2022 | Choi | F16M 11/046 |
| 11,723,160 | B2 * | 8/2023 | Pyo | G06F 1/181<br>361/807 |
| 12,538,442 | B2 * | 1/2026 | Pyo | G09F 9/30 |
| 2007/0159035 | A1 * | 7/2007 | Mullen | A47B 46/005<br>312/245 |
| 2011/0304781 | A1 * | 12/2011 | Rowell | F16M 13/02<br>348/841 |
| 2018/0070467 | A1 * | 3/2018 | Kim | H10K 50/84 |
| 2019/0371214 | A1 * | 12/2019 | Kim | G09F 9/301 |
| 2020/0035133 | A1 * | 1/2020 | Pyo | G09F 9/301 |
| 2021/0158727 | A1 * | 5/2021 | Choi | F16M 11/046 |
| 2021/0337684 | A1 * | 10/2021 | Pyo | H05K 5/0217 |
| 2021/0392765 | A1 * | 12/2021 | Pyo | G06F 1/181 |
| 2022/0039275 | A1 * | 2/2022 | Kang | G06F 1/1603 |
| 2022/0178493 | A1 * | 6/2022 | Seol | G02F 1/133322 |
| 2022/0406228 | A1 * | 12/2022 | Choi | F16M 13/005 |

FOREIGN PATENT DOCUMENTS

| | | |
|---|---|---|
| KR | 1020200114337 | 10/2020 |
| KR | 102252777 | 5/2021 |
| KR | 1020210062337 | 5/2021 |

* cited by examiner

DISPLAY DEVICE

CROSS-REFERENCE TO RELATED APPLICATION(S)

This application is the National Stage filing under 35 U.S.C. 371 of International Application No. PCT/KR2022/009635, filed on Jul. 5, 2022, the contents of which are all incorporated by reference herein in its entirety.

TECHNICAL FIELD

The following description relates to a display device.

BACKGROUND ART

With the development of the information society, there have been growing demands for various types of display devices, and in order to meet these demands, various display devices, such as a liquid crystal display (LCD) device, a Plasma Display Panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light provided by a backlight unit. Further, the OLED panel may display images by using a self-emitting organic layer deposited on a substrate on which transparent electrodes are formed.

Recently, many studies are being conducted on a structure for covering the front surface of a display panel.

In addition, many studies are being conducted on a driving mechanism for moving a display panel, as a structure for opening and closing the front surface of the display panel relative to a cover.

DISCLOSURE OF INVENTION

Technical Problem

It is an objective of the present disclosure to solve the above and other problems.

It is another objective of the present disclosure to provide a display device capable of opening and closing the front surface of a display panel.

It is yet another objective of the present disclosure to provide a structure for moving a display panel.

It is still another objective of the present disclosure to provide a structure for minimizing tilting left and right during up and down movement of a display panel.

It is further another objective of the present disclosure to provide a structure for minimizing friction noise generated during movement of a display panel.

It is yet another objective of the present disclosure to provide a structure for minimizing wear of a driving module that moves a display panel.

It is yet another objective of the present disclosure to provide a structure for preventing a belt, which moves a display panel, from being wound while being in a loose or folded state.

Solution to Problem

In accordance with an aspect of the present disclosure, the above and other objectives can be accomplished by providing a display device including: a display panel; a frame including a first frame disposed adjacent to a first side of the display panel, and a second frame disposed adjacent to a second side of the display panel; and a driving module configured to move the display panel in a direction in which the first frame and the second frame are spaced apart from each other, wherein the driving module includes: a roller coupled to the first frame; a pulley coupled to the second frame; a motor configured to provide torque to the roller; and a belt having a first end fixed to the roller and a second end fixed to the display panel, wherein the belt is stretched over the pulley at a position between the first end and the second end

Advantageous Effects of Disclosure

The display device according to the present disclosure has the following effects.

According to at least one of the embodiments of the present disclosure, a display device capable of opening and closing the front surface of a display panel may be provided.

According to at least one of the embodiments of the present disclosure, a structure for moving a display panel may be provided.

According to at least one of the embodiments of the present disclosure, a structure for minimizing tilting left and right during up and down movement of a display panel may be provided.

According to at least one of the embodiments of the present disclosure, a structure for minimizing friction noise generated during movement of a display panel may be provided.

According to at least one of the embodiments of the present disclosure, a structure for minimizing wear of a driving module that moves a display panel may be provided.

According to at least one of the embodiments of the present disclosure, there may be provided a structure for preventing a belt, which moves a display panel, from being wound while being in a loose or folded state.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

MODE OF DISCLOSURE

Figure 1:
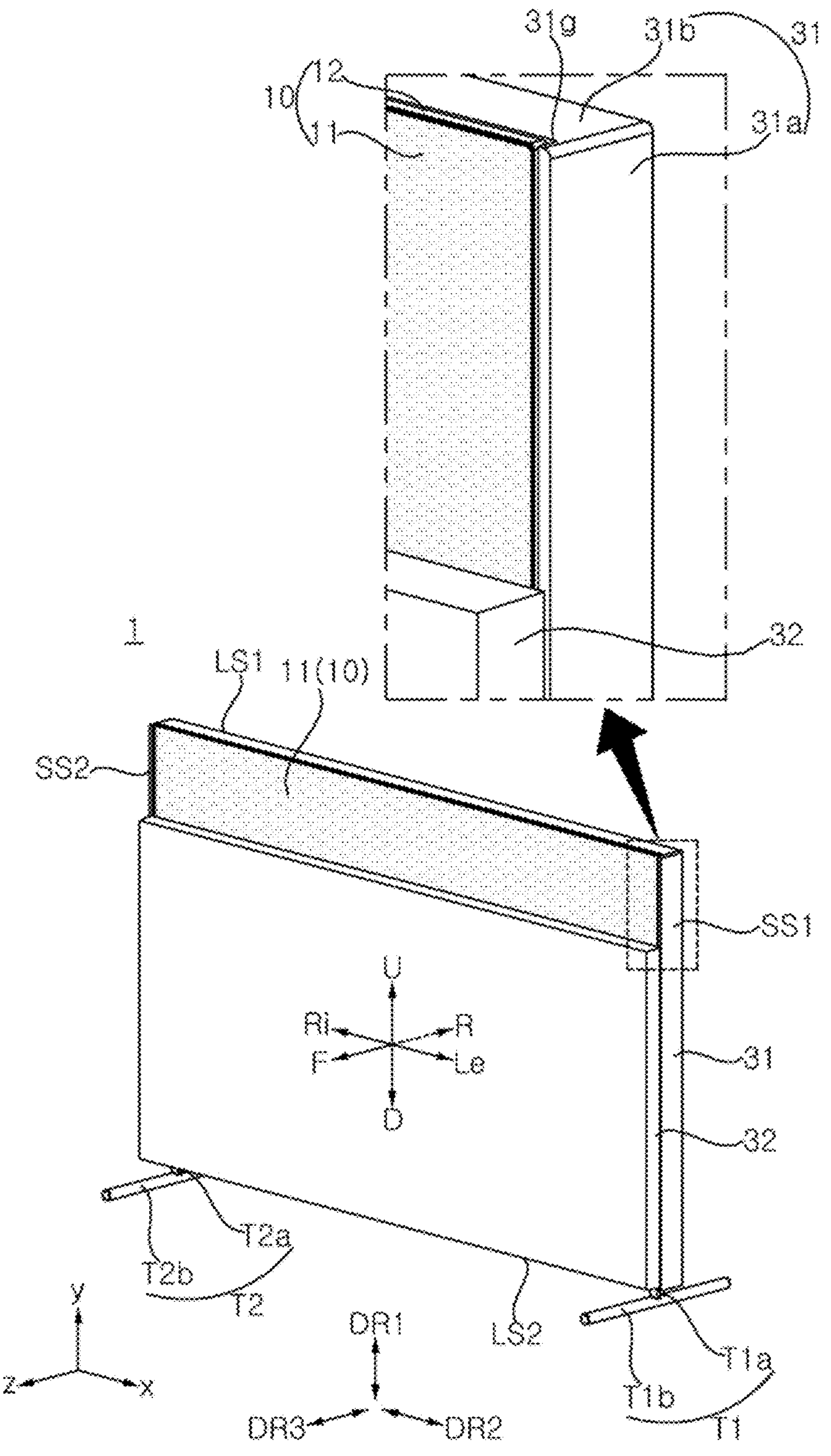
FIGS. 1 to 19 are diagrams illustrating examples of a display device according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The suffixes, such as “module” and “unit,” for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

It should be understood that the terms "comprise," "include," "have," etc. when used in this specification, specify the presence of stated features, integers, steps, operations, elements, components, or combinations thereof but do not preclude the presence or addition of one or more other features, integers, steps, operations, elements, components, or combinations thereof.

References to directions, such as up (U), down (D), left (Le), right (Ri), front (F), and rear (R), shown in the drawings are provided merely for convenience of explanation and are not intended for limiting the scope of the present disclosure.

Referring to FIG. 1, a display device 1 may include a display panel 11. The display panel 11 may display an image.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the short sides SS1 and SS2 of the display device 1 may be referred to as a first direction DR1 or an up-down direction. A direction parallel to the long sides LS1 and LS2 of the display device 1 may be referred to as a second direction DR2 or a left-right direction. A direction perpendicular to the long sides LS1 and LS2 and the short sides SS1 and SS2 of the display device 1 may be referred to as a third direction DR3 or a front-rear direction.

A side on which the display panel 11 displays an image may be referred to as a front side F, z, and a side opposite thereto may be referred to as a rear side R. The first short side SS1 may be referred to as a left side Le, x, and the second short side SS2 may be referred to as a right side Ri. The first long side LS1 may be referred to as an upper side U, y, and the second long side LS2 may be referred to as a lower side D.

The first long side LS1, the second long side LS2, the first short side SS1, and the second short side SS2 may be referred to as edges of the display device 1. Further, positions where the first long side LS1, the second long side LS2, the first short side SS1, and the second short side SS2 meet each other may be referred to as corners.

Figure 2:
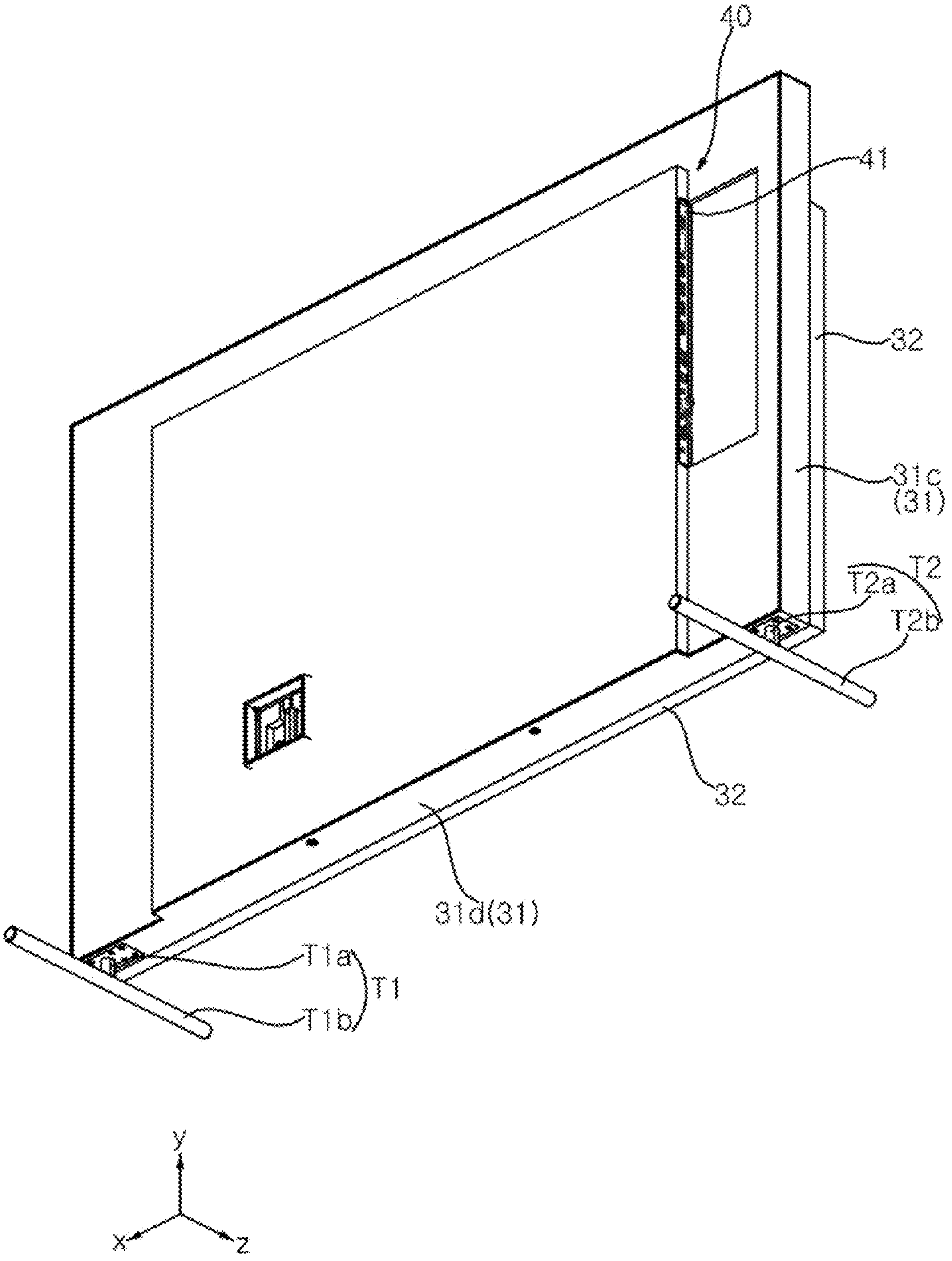

Referring to FIGS. 1 and 2, a front case 32 may be disposed at the front of the display panel 11. The front case 32 may cover at least a portion of a front surface of the display panel 11. The front case 32 may form at least a portion of the front surface of the display device 1. A height of the front case 32 in the up-down direction DR1 may be smaller than a height of the display panel 11 in the up-down direction DR1. However, the height of the front case 32 in the up-down direction DR1 is not limited thereto and may be equal to the height of the display panel 11 in the up-down direction DR1.

A side case 31 may extend along the perimeter of the display panel 11. The side case 31 may cover a side surface of the display panel 11. A first part 31*a* may form a left side of the side case 31. A second part 31*b* may form an upper side of the side case 31. A third part 31*c* may form a right side of the side case 31. A fourth part 31*d* may form a lower side of the side case 31.

A rear case 40 may be opposite the front case 32 with respect to the side case 31. The rear case 40 may form a rear surface of the display device 1. The front case 32, the side case 31, and the rear case 40 may be coupled to each other.

Input/output units 41 may be formed on one side of the rear case 40. For example, the input/output units 41 may include video and/or audio input/output terminals, a USB port, a power input terminal, and the like.

Stands T1 and T2 may support the display device 1. The stands T1 and T2 may include a first stand T1 and a second stand T2 which are spaced apart from each other in the left-right direction. The stands T1 and T2 may include fixing parts T1*a* and T2*a* coupled to the fourth part 31*d* of the side case 31, and supports T1*b* and T2*b* connected to the fixing parts T1*a* and T2*a* and placed on the ground and the like.

Figure 3:
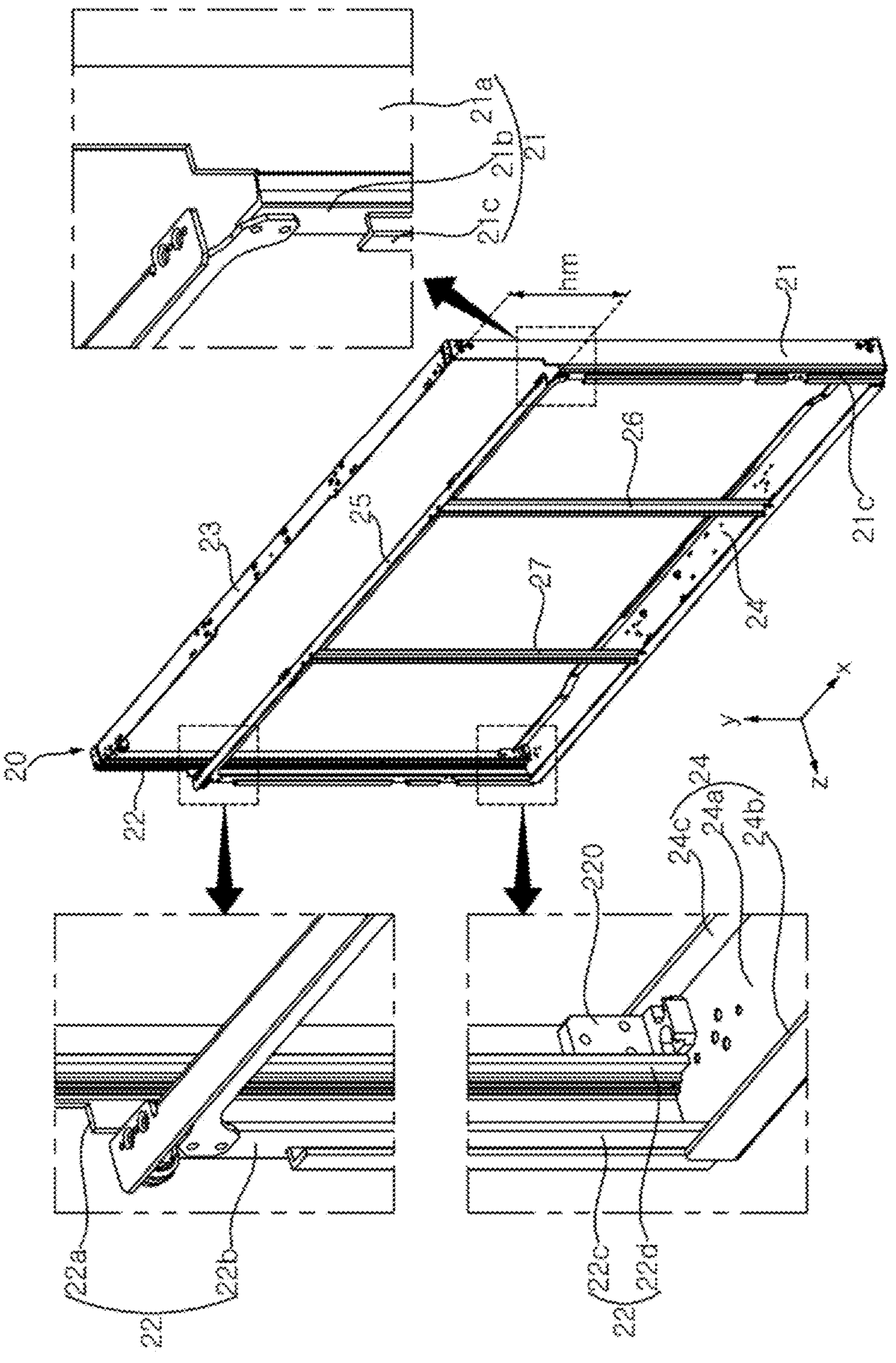

Referring to FIG. 3, the frame 20 may form the skeleton of the display device 1. The frame 20 may be disposed in an internal space of the front case 32, the side case 31, and the rear case 40. The frame 20 may include outer frames 21, 22, 23, and 24, a horizontal frame 25, and vertical frames 26 and 27.

The outer frames 21, 22, 23, and 24 may form an outer perimeter of the frame 20. A first outer frame 21 may extend vertically and may form the left side of the outer frames 21, 22, 23, and 24. A second outer frame 22 may be opposite to the first outer frame 21 and may form the right side of the outer frames 21, 22, 23, and 24. A third outer frame 23 may extend horizontally and may form the upper side of the outer frames 21, 22, 23, and 24. The third outer frame 23 may be coupled to an upper end of the first outer frame 21 and an upper end of the second outer frame 22 by a fastening member. A fourth outer frame 24 may be opposite to the third outer frame 23 and may form the lower side of the outer frames 21, 22, 23, and 24. The fourth outer frame 24 may be coupled to a lower end of the first outer frame 21 and a lower end of the second outer frame 22 by fastening members 210 and 220 (see FIGS. 3 and 5). The fourth outer frame 24 may be referred to as a first frame, and the third outer frame 23 may be referred to as a second frame.

A first rib 21*b* may be bent rightward from a front end of a left part 21*a* of the first outer frame 21. A first vertical rib 21*c* may be formed on the first rib 21*b* and/or the left part 21*a*.

A second rib 22*b* may be bent leftward from a front end of a right part 22*a* of the second outer frame 22. In addition, second vertical ribs 22*c* and 22*d* may be formed on the second rib 22*b* and/or the right part 22*a*.

The horizontal frame 25 may be disposed between the first outer frame 21 and the second outer frame 22 and may extend horizontally. A first end of the horizontal frame 25 may be coupled to the first rib 21*b* of the first outer frame 21, and a second end of the horizontal frame 25 may be coupled to the second rib 22*b* of the second outer frame 22. The horizontal frame 25 may be spaced downward from the third outer frame 23 (see hm). The horizontal frame 25 may be disposed closer to the third outer frame 23 than the fourth outer frame 24.

The vertical frames 26 and 27 may be disposed between the horizontal frame 25 and the fourth outer frame 24 and may extend horizontally. A first end of the vertical frames 26 and 27 may be coupled to the horizontal frame 25 and a second end of the vertical frames 26 and 27 may be coupled to the fourth outer frame 24. The vertical frames 26 and 27 may include a first vertical frame 26 and a second vertical frame 27 that are horizontally spaced apart from each other. The first vertical frame 26 may be disposed closer to the first outer frame 21 than the second vertical frame 27. The second vertical frame 27 may be disposed closer to the second outer frame 22 than the first vertical frame 26.

Figure 4:
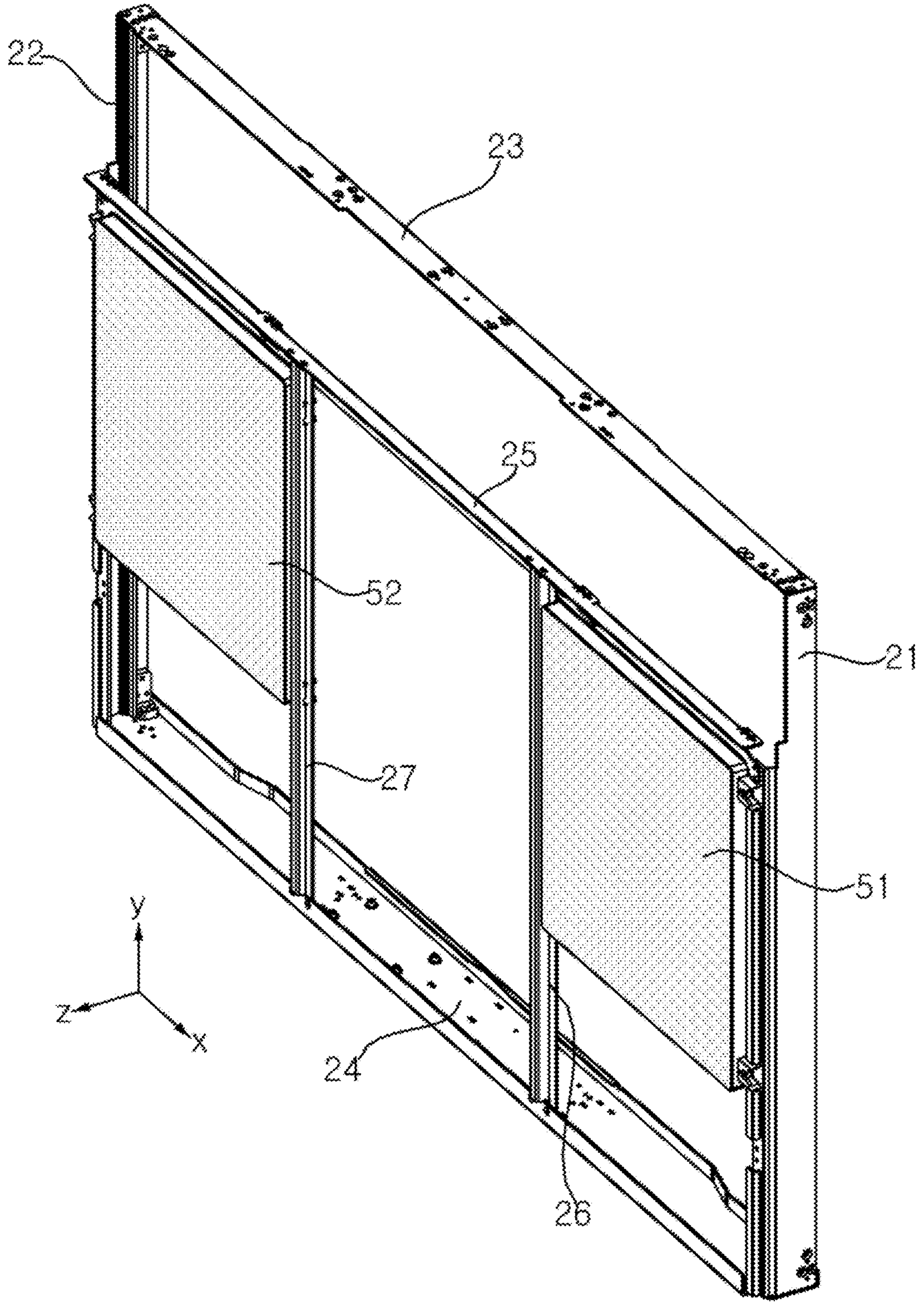

Referring to FIG. 4, speakers 51 and 52 may be disposed between the horizontal frame 25 and the fourth outer frame 24. The speakers 51 and 52 may be disposed closer to the horizontal frame 25 than the fourth outer frame 24. A first speaker 51 may be coupled to the first rib 21*b* (see FIG. 3) of the first outer frame 21 and the first vertical frame 26. A second speaker 52 may be coupled to the second rib 22*b* (see FIG. 3) of the second outer frame 22 and the second vertical frame 27. The speakers 51 and 52 may provide sound in a direction toward the front side of the display device.

Figure 5:
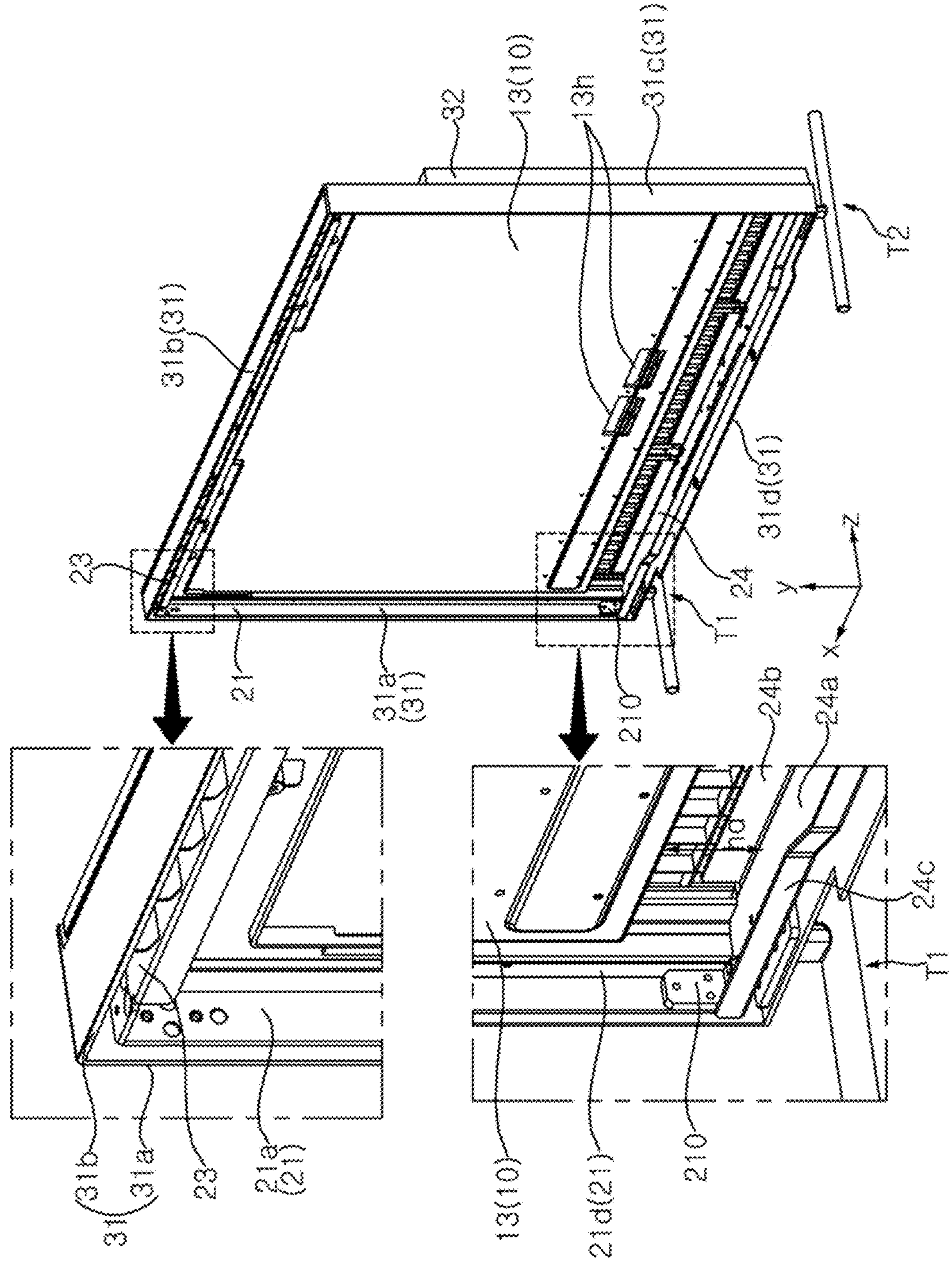
Figure 6:
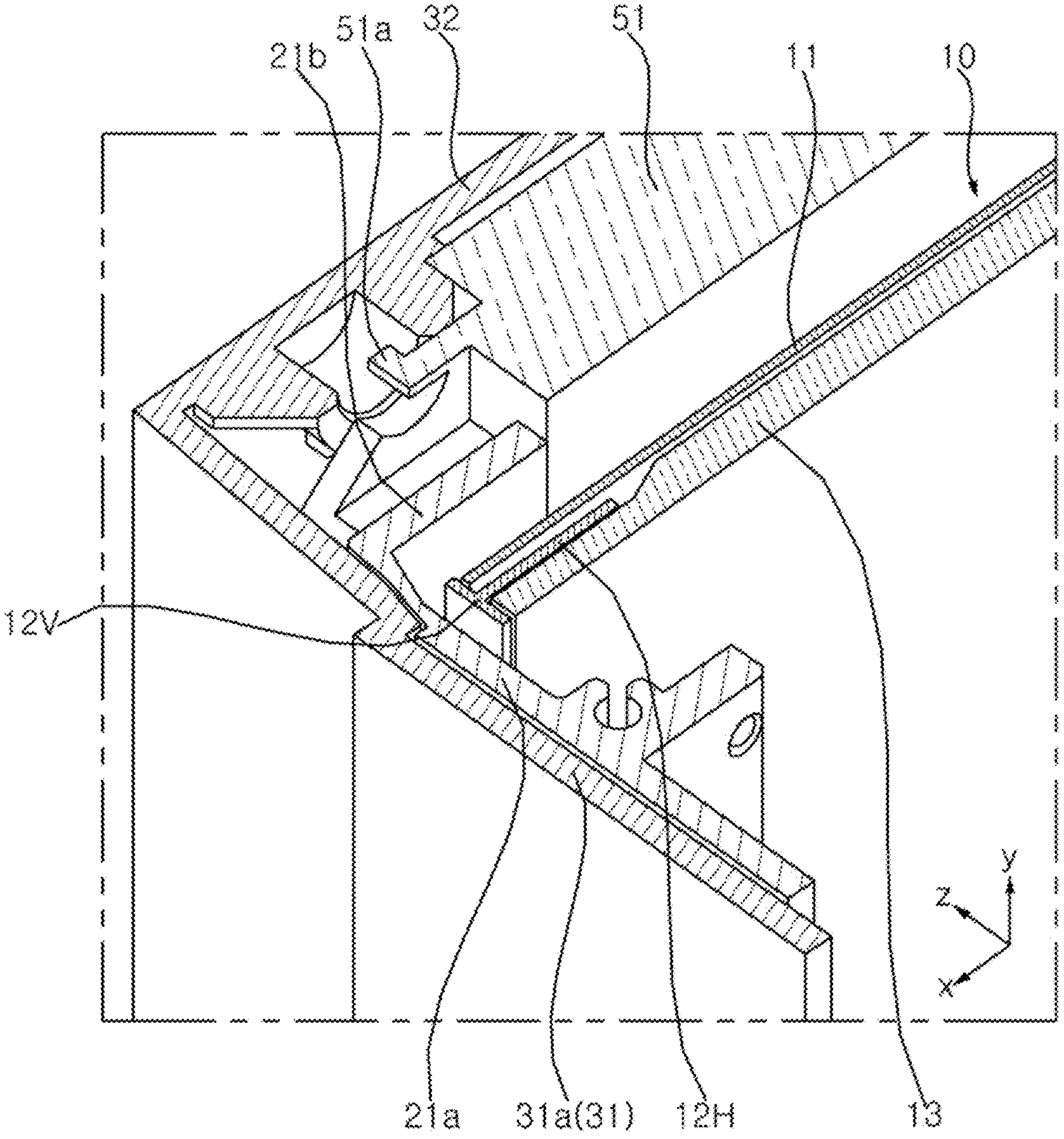

Referring to FIGS. 5 and 6, the speakers 51 and 52 may be disposed inside the front case 32. For example, a plurality of holes may be formed through a front surface of the front case 32. Meanwhile, for example, the side case 31 and the front case 32 may be formed as one body.

The first part 31*a* may cover the left surface of the first outer frame 21. The second part 31*b* may cover the upper surface of the third outer frame 23. The third part 31*c* may cover the right surface of the second outer frame 22 (see FIG. 4). The fourth part 31*d* may cover the lower surface of the fourth outer frame 24.

A display unit 10 may be disposed inside the outer frames 21, 22, 23, and 24, and may be disposed at the rear of the speakers 51 and 52. The display unit 10 may be disposed at the rear of the horizontal frame 25 and the vertical frames 26 and 27 (see FIG. 4). The display unit 10 may include the display panel 11, a middle cabinet 12, and a module cover 13.

For example, the display panel 11 may be an OLED panel, an LCD panel, or an LED panel. The display panel 11 may divide an image into a plurality of pixels and may output the image while controlling color, brightness, and chroma of the respective pixels. The display panel 11 may be divided into an active area, in which the image is displayed, and a de-active area in which the image is not displayed. The display panel 11 may generate light corresponding to red, green, or blue color in response to a control signal.

The middle cabinet 12 (see FIG. 1) may form the side surface of the display unit 10. A horizontal part 12H of the middle cabinet 12 may be disposed at the rear of the display panel 11 and may be coupled to the display panel 11. The horizontal part 12H of the middle cabinet 12 may be disposed between the display panel 11 and the module cover 13. A vertical part 12V of the middle cabinet 12 may intersect the horizontal part 12H. The vertical part 12V of the middle cabinet 12 may cover the side surface of the display panel 11. The vertical part 12V of the middle cabinet 12 may cover the side surface of the module cover 13. For example, the middle cabinet 12 may include a metal or plastic material. The middle cabinet 12 may be referred to as a side frame or a guide panel.

The module cover 13 may form the rear surface of the display unit 10. The module cover 13 may be opposite the display panel 11 with respect to the horizontal part 12H. The module cover 13 may be coupled to the horizontal part 12H. For example, the module cover 13 may include a metal material. The module cover 13 may be referred to as a plate or a frame.

A first hole 13*h* may be adjacent to the lower side of the module cover 13 and may be formed through the module cover 13. The first hole 13*h* may be referred to as a first cable hole.

The fourth outer frame 24 may include a base 24*a*, a front rib 24*b*, and a rear rib 24*c*. The base 24*a* may face the fourth part 31*d* and may be spaced downward from the lower side of the module cover 13 (see hd of FIG. 5). The front rib 24*b* may be bent upward from a front end of the base 24*a* and may extend in the left-right direction. The rear rib 24*c* may be bent upward from a rear end of the base 24*a* and may extend in the left-right direction.

The fourth outer frame 24 may be referred to as a first frame 24, and the third outer frame 23 may be referred to as a second frame 23.

Figure 7:
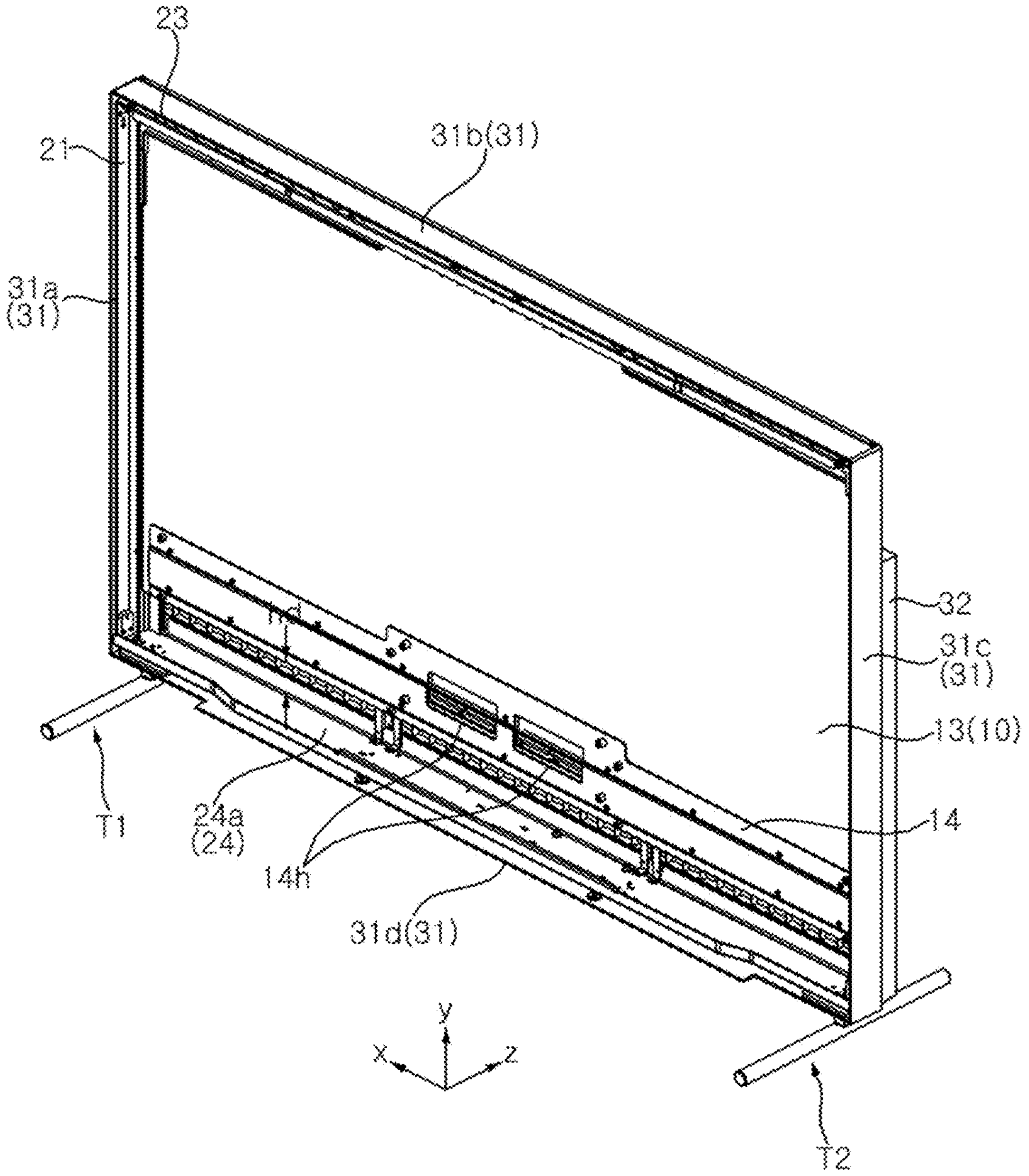

Referring to FIG. 7, a plate 14 may be disposed at the rear of the module cover 13. The plate 14 may be coupled or fixed to the rear surface of the module cover 13. The plate 14 may overlap at least a portion of the rear surface of the module cover 13 in the front-rear direction. The plate 14 may be disposed adjacent to the lower side of the module cover 13. The plate 14 may extend in the left-right direction along the lower side of the module cover 13. A first end of the plate 14 may be adjacent to the left side of the module cover 13, and a second end of the plate 14 may be adjacent to the right side of the module cover 13. The lower side of the plate 14 may be spaced upward from the base 24*a*. For example, the plate 14 may include a metal material.

A second hole 14*h* may be formed through the plate 14. The second hole 14*h* may be aligned with the first hole 13*h* (see FIG. 5).

Figure 8:
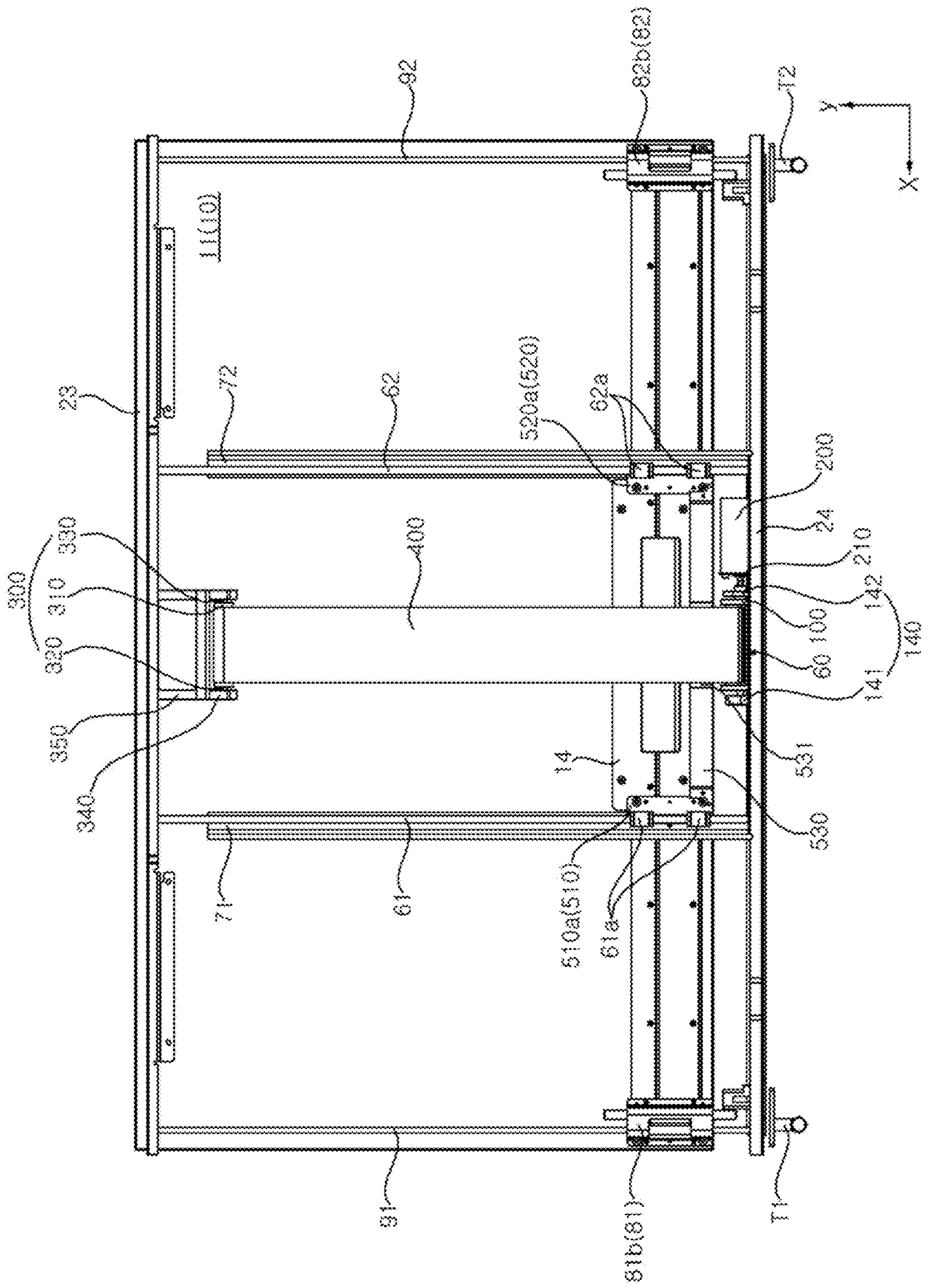
Figure 9:
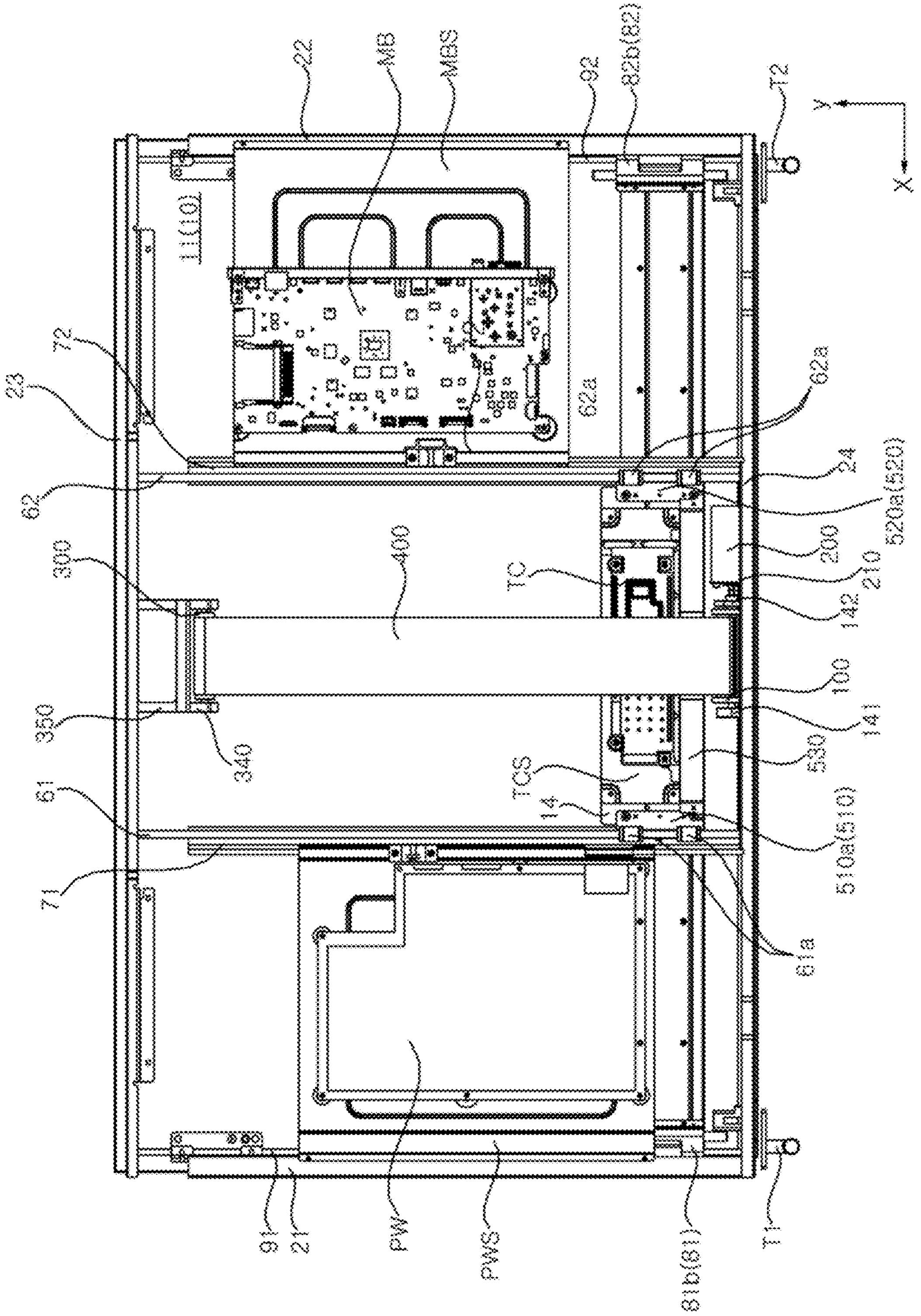

Referring to FIGS. 8 and 9, bars 71 and 72 may be disposed between the third outer frame 23 and the fourth outer frame 24 and may be elongated vertically. The bars 71 and 72 may be disposed between the first outer frame 21 and the second outer frame 22, and may be spaced apart from the first and second outer frames 21 and 22, respectively. An upper end of the bars 71 and 72 may be fixed to the third outer frame 23, and a lower end of the bars 71 and 72 may be fixed to the fourth outer frame 24. A first bar 71 and a second bar 72 may be horizontally spaced apart from each other. The first bar 71 may be disposed closer to the first outer frame 21 than the second bar 72. The second bar 72 may be disposed closer to the second outer frame 22 than the first bar 71.

A power supply board PW may be disposed at the rear of the module cover 13. A first shield plate PWS may be disposed between the first bar 71 and the first outer frame 21. The first shield plate PWS may have a first end coupled to the first bar 71 and a second end coupled to the first outer frame 21. The power supply board PW may be disposed at the rear of the first shield plate PWS. The power supply board PW may be coupled to the first shield plate PWS. The power supply board PW may be coupled to the first bar 71 through the first shield plate PWS. The power supply board PW may supply power to each component of the display device 1.

A main board MB may be disposed at the rear of the module cover 13. A second shield plate MBS may be disposed between the second bar 72 and the second outer frame 22. The second shield plate MBS may have a first end coupled to the second bar 72 and a second end coupled to the second outer frame 22. The main board MB may be disposed at the rear of the second shield plate MBS. The main board MB may be coupled to the second shield plate MBS. The main board MB may be coupled to the second bar 72 through the second shield plate MBS. The main board MB may control the display device.

A timing controller (T-CON) board TC may be disposed at the rear of the plate 14. A third shield plate TCS may be coupled to the rear surface of the plate 14. The T-CON board TC may be disposed at the rear of the third shield plate TCS. The T-CON board TC may be coupled to the plate 14 through the third shield plate TCS. In this case, a third hole may be formed through the third shield plate TCS and may be aligned with the second hole 14*h*. A cable (not shown) may pass through the first hole 13*h* (see FIG. 5), the second hole 14*h*, and the third hole, and may be electrically connected to the display panel 11 (see FIG. 6) and the T-CON board TC. For example, the cable may be a flat flexible cable (FFC). The T-CON board TC may provide a video signal to the display panel 11.

A driving module 60 may move the display panel 11 in the up-down direction. The driving module 60 may move the display unit 10 in the up-down direction. The driving module 60 may be referred to as a lift assembly.

The driving module 60 may include a roller 100, a pulley 300, a motor 200, and a belt 400. The roller 100 may be coupled to the first frame 24. The roller 100 may be coupled to the base 24*a* of the first frame 24. The motor 200 may be fixed to the first frame 24. The motor 200 may be fixed to the base 24*a* of the first frame 24. The motor 200 may provide torque to the roller 100. The pulley 300 may be disposed adjacent to the second frame 23. The pulley 300 may be rotatably coupled to the second frame 23. The pulley 300 may be spaced downward from the second frame 23. The pulley 300 may vertically overlap the roller 300. The pulley 300 may serve as an idler.

The pulley 300 may include a pulley body 310, and protrusions 320 and 330 protruding from the pulley body 310. The pulley body 310 may have a cylindrical shape. The belt 400 may be stretched over the pulley body 310. As the display panel 11 moves, the belt 400 may move along an outer circumferential surface of the pulley body 310. The protrusions 320 and 330 may include a first protrusion 320 and a second protrusion 330 that are disposed opposite each other with respect to the pulley body 310. The first protrusion 320 may protrude leftward from the left surface of the pulley body 310, and the second protrusion 330 may protrude rightward from the right surface of the pulley body 310. The first protrusion 320 and the second protrusion 330 may overlap horizontally. An imaginary line horizontally connecting the first protrusion 320 and the second protrusion 330 may coincide with a rotation axis of the pulley body 310. The protrusions 320 and 330 and the pulley body 310 may be formed as one body.

Figure 10:
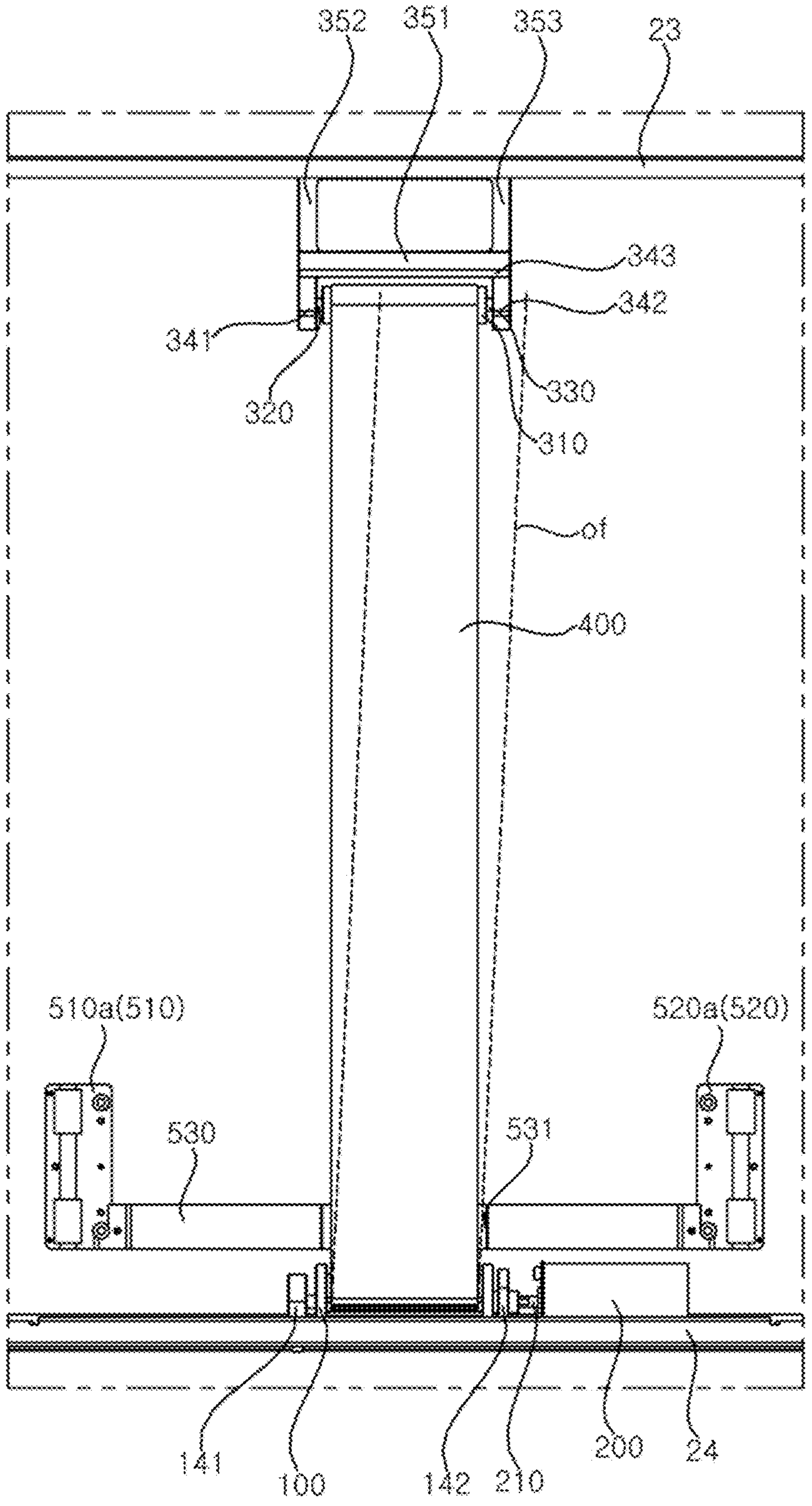

A pulley holder 340 may hold the pulley 3. The pulley holder 340 may rotatably support the pulley 300. The pulley holder 340 may include a first pulley holder 341 and a second pulley holder 342 that are horizontally spaced apart from each other (see FIG. 10). The first pulley holder 341 may be coupled to the first protrusion 320 of the pulley 300. A groove (not shown), into which an end of the first protrusion 320 of the pulley 300 is inserted, may be formed in the first pulley holder 341. The first protrusion 320 may be rotatably coupled to the first pulley holder 341. A first ring member (not shown) may be disposed between the groove (not shown) of the first pulley holder 341 and the first protrusion 320. The first ring member (not shown) may support the first protrusion 320 or the pulley 300 so that the pulley 300 may rotate relative to the pulley holder 340. For example, the first ring member (not shown) may be a bearing. A second pulley holder 342 may be coupled to the second protrusion 330 of the pulley 300. A groove (not shown), into which an end of the second protrusion 330 of the pulley 300 is inserted, may be formed in the second pulley holder 342. The second protrusion 330 may be rotatably coupled to the second pulley holder 342. A second ring member (not shown) may be disposed between the groove (not shown) of the second pulley holder 342 and the second protrusion 330. The second ring member (not shown) may support the second protrusion 330 or the pulley 300 so that the pulley 300 may rotate relative to the pulley holder 340. For example, the second ring member (not shown) may be a bearing.

A connection plate 343 (see FIG. 10) may connect the first pulley holder 341 and the second pulley holder 342. For example, the connection plate 343 may be provided as a flat plate. The first pulley holder 341 may be coupled to a left end of the connection plate 343, and the second pulley holder 342 may be coupled to a right end of the connection plate 343.

The pulley holder 340 may be supported by a pulley holder fixing part 350 which will be described below, and may be spaced apart from the second frame 23. Unlike the example, the pulley holder 340 may be coupled to the second frame 23, in which case the pulley holder fixing part 350 may be omitted.

The pulley holder fixing part 350 may support the pulley holder 340 and/or the pulley 300. The pulley holder fixing part 350 may allow the pulley holder 340 and/or the pulley 300 to be spaced downward from the second frame 23. The pulley holder fixing part 350 may be fixed to the second frame 23. The pulley holder fixing part 350 may include a bottom plate 351 coupled to the connection plate 343 of the pulley holder 340, a first vertical bar 352 coupled to a left end of the bottom plate 351, and a second vertical bar 353 coupled to a right end of the bottom plate 351. The bottom plate 351 may have the same area as the connection plate 343 of the pulley holder 340. The bottom plate 351 may be provided as a flat plate. The first vertical bar 352 and the second vertical bar 353 may be horizontally spaced apart from each other. The first vertical bar 352 may vertically overlap the first pulley holder 341. The first vertical bar 352 may be opposite the first pulley holder 341 with respect to the bottom plate 351 or the connection plate 343. The second vertical bar 353 may vertically overlap the second pulley holder 342. The second vertical bar 353 may be opposite the second pulley holder 342 with respect to the bottom plate 351 or the connection plate 343. The first vertical bar 352 and the second vertical bar 353 may connect the bottom plate 351 and the second frame 23. The pulley holder fixing part 350 may further include an upper plate (not shown)

which connects the first vertical bar 352 and the second vertical bar 353 and is coupled to the second frame 23. The upper plate (not shown) may be disposed above the bottom plate 351. The upper plate (not shown) may be vertically spaced apart from the bottom plate 351. The upper plate (not shown) may be provided as a flat plate.

Figure 11:
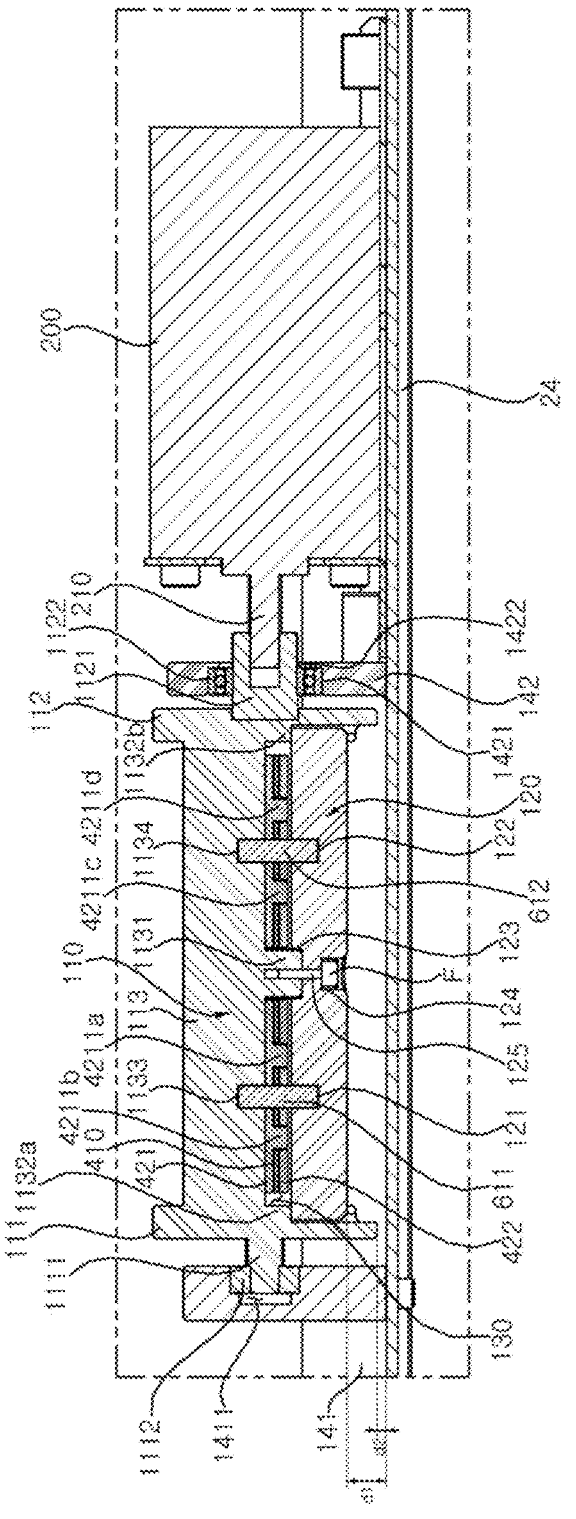
Figure 12:
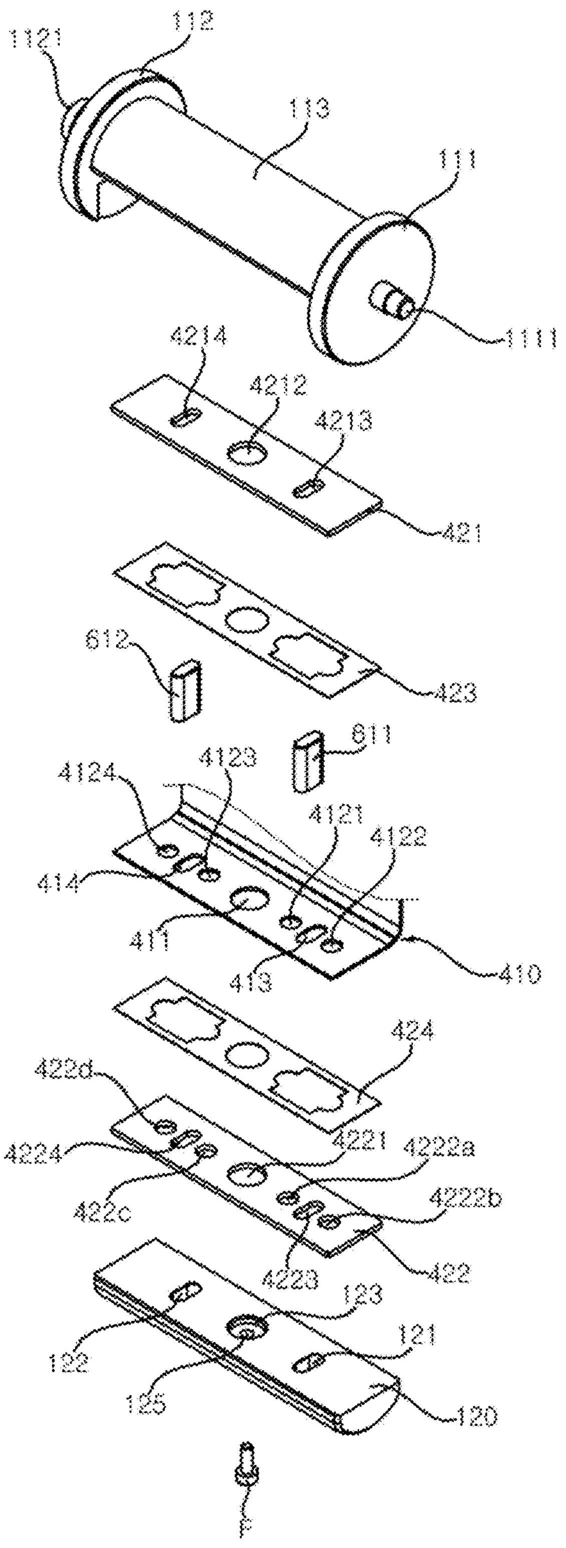

Referring to FIGS. 9, 11, and 12, the roller 100 may be rotatably coupled to the first frame 24. The roller 100 may be spaced apart from the base 24*a* of the first frame 24 by a predetermined distance. The roller 100 may include a first part 110, and a second part 120 coupled to the first plate 110. A space 130 may be formed between the first part 110 and the second part 120. The first part 110 and the second part 120 may rotate together. The first part 110 and the second part 120 may rotate as one body.

The first part 110 may include a first side plate 111, a second side plate 112, and a roller body 113. The first side plate 111 and the second side plate 111 may be horizontally spaced apart from each other. The first side plate 111 and the second side plate 112 may be opposite each other with respect to the roller body 113. The first side plate 111 and the second side plate 112 may have the same shape and size. For example, the first side plate 111 and the second side plate 112 may have a circular plate shape. The first side plate 111 may be formed on the left surface of the roller body 113, and the second side plate 111 may be formed on the right surface of the roller body 113.

The belt 400 may be wound around or unwound from the roller body 113. The roller body 113 may be disposed between the first side plate 111 and the second side plate 112. The roller body 113 may connect the first side plate 111 and the second side plate 112. The roller body 113 may have a cylindrical shape with a smaller diameter than the side plates 111 and 112. The first side plate 111 and the second side plate 112 may guide the belt 400 which is wound around or unwound from the roller body 113, so that the belt 400 may not be separated to the outside of the roller body 113.

The first side plate 111 may include a first side protrusion 1111 protruding leftward from the first side plate 111. The second side plate 112 may include a second side protrusion 1121 protruding rightward from the second side plate 112. The first side protrusion 1111 and the second side protrusion 1121 may overlap horizontally. An imaginary line connecting the first side protrusion 1111 and the second side protrusion 1121 may be collinear with the rotation axis of the roller 100.

A roller holder 140 may be fixed to the second frame 24. The roller holder 140 may be fixed to the base 24*a* of the second frame 24. The roller holder 140 may hold the roller 100. The roller holder 140 may support the roller 100 while keeping the roller 100 separated from the base 24*a* of the second frame 24. The roller holder 140 may hold the roller 100 so that the roller body 113 may be separated from the base 24*a* of the first frame 24. In this case, a space between the roller body 113 and the base 24*a* of the second frame 24 may have a first separation distance d1. The roller holder 140 may hold the roller 100 so that the side plates 111 and 112 may be separated from the base 24*a* of the first frame 24. In this case, a space between the side plates 111 and 112 and the base 24*a* of the second frame 24 may have a second separation distance d2. In this manner, the roller 100 may rotate without interfering with the second frame 24. The first separation distance d1 may be greater than the second separation distance d2. In this manner, it is possible to secure space for the belt 400 wound around the roller body 113 as the roller 100 rotates, and the belt 400 may be wound around the roller body 113 without interfering with the second frame 24.

The roller holder 140 may include a first roller holder 141 and a second roller holder 142 that are horizontally spaced apart from each other. The first roller holder 141 may be disposed on the left side of the roller 100, and the second roller holder 142 may be disposed on the right side of the roller 100. The first roller holder 141 may be coupled to the first side protrusion 1111 of the roller 100. The first roller holder 141 may have a first groove 1411 into which an end of the first side protrusion 1111 of the roller 100 is inserted. The first side protrusion 1111 may be rotatably coupled to the first roller holder 141. A third ring member 1112 may be disposed between the first groove 1411 of the first roller holder 141 and the first side protrusion 1111. The third ring member 1112 may support the first side protrusion 1111 or the roller 100 so that the roller 100 may rotate relative to the roller holder 140. For example, the third ring member 1112 may be a bearing.

The second roller holder 142 may be coupled to the second side protrusion 1121 of the roller 100. The second roller holder 142 may have a second groove 1421, formed in a surface facing the second side plate 112, and a hole 1422 formed in the second groove 1421 and passing through the second roller holder 142. A diameter of the second groove 1421 of the second roller holder 142 may be greater than a diameter of the hole 1422 of the second roller holder 142. The second side protrusion 1121 may pass through the hole 1422 of the second roller holder 142. A fourth ring member 1122 may be disposed between the second side protrusion 1121 and the second groove 1421 of the roller holder 142. The fourth ring member 1122 may support the second side protrusion 1121 or the roller 100 so that the roller 100 may rotate relative to the roller holder 140. For example, the fourth ring member 1122 may be a bearing. The second side protrusion 1121 may be coupled to a rotating shaft 210 of the motor 200. The second side protrusion 1121 may include a protruding portion (not numbered) that passes through the hole 1422 of the second roller holder 142 and protrudes to the right side of the second roller holder 1422, and the protruding portion (not numbered) of the second side protrusion 1121 may be coupled to the rotating shaft 210 of the motor 200. Accordingly, the roller 100 may rotate by receiving torque from the motor 200.

The rotation axis of the roller 100 may be parallel to the rotating shaft 210 of the motor 200. The rotation axis of the roller 100 may be perpendicular to a moving direction of the display panel 11.

The second part 120 may be coupled to the roller body 113. The roller body 113 may include a coupling portion 1131. The coupling portion 1131 may protrude from the roller body 113 toward the second part 120. The coupling portion 1131 may be formed at the center of the roller body 113. The coupling portion 1131 may be at least partially inserted into an upper groove 123 of the second part 120 which will be described below. A fastening member F passing through the second part 120 may be inserted into the coupling portion 1131. In this manner, the first part 110 and the second part 120 may be coupled to each other and may rotate together.

The roller body 113 may include step portions 1132*a* and 1132*b*. The step portions 1132*a* and 1132*b* may be formed at connected portions between the lower end of the roller body 113 and the side plates 111 and 112. The step portions 1132*a* and 1132*b* may include a first step portion 1132*a* which protrudes from an edge portion at the lower end of the roller body 113 and is connected to the first side plate 111, and a second step portion 1132*b* which protrudes from the edge portion at the lower end of the roller body 113 and is connected to the second side plate 111. The first step portion 1132*a* and the second step portion 1132*b* may be horizontally spaced apart from each other. The upper surface of the second part 120 may contact the lower surface of the first step portion 1132*a* and the second step portion 1132*b*. A space 130 may be formed between an inner surface of the first step portion 1132*a* and an inner surface of the second step portion 1132*b*. A first end 410 of the belt 400 may be disposed in the space 130.

The roller body 113 may include supporter insertion grooves 1133 and 1134. A first supporter 610 to be described below may be inserted into the supporter insertion grooves 1133 and 1134. The supporter insertion grooves 1133 and 1134 may include a plurality of supporter insertion grooves 1133 and 1134. For example, the plurality of supporter insertion grooves 1133 and 1134 may include two supporter insertion grooves 1133 and 1134. However, the supporter insertion grooves are not limited thereto, and may be provided in number corresponding to the number of the first supporter 610.

The supporter insertion grooves 1133 and 1134 may include a first left supporter insertion groove 1133 and a first right supporter insertion groove 1134 that are horizontally spaced apart from each other. The first left supporter insertion groove 1133 may be located further to the left than the first right supporter insertion groove 1134. The first right supporter insertion groove 1134 may be located further to the right than the first left supporter insertion groove 1133. The first left supporter insertion groove 1133 may be formed on the left side of the coupling portion 1131, and the first right supporter insertion groove 1134 may be formed on the right side of the coupling portion 1131. The first left supporter insertion groove 1133 may be vertically aligned with a second left supporter insertion groove 121 which will be described below. The first right supporter insertion groove 1134 may be vertically aligned with a second right supporter insertion groove 122 which will be described below. An upper end of a first left supporter 611 may be inserted into the first left supporter insertion groove 1133. An upper end of a first right supporter 611 may be inserted into the first right supporter insertion groove 1134.

The second part 120 may be coupled to the roller body 113. An outer edge portion of the second part 120 may contact the step portions 1132*a* and 1132*b* of the roller body 113. A left edge portion of the second part 120 may contact the first step portion 1132*a*, and a right edge portion of the second part 120 may contact the second step portion 1132*b*. A central portion disposed between the left edge portion and the right edge portion of the second part 120 may face the lower surface of the roller body 113 and may be spaced apart from the lower surface of the roller body 113 to form the space 130.

The upper groove 123 may be formed in the second part 120. The upper groove 123 may be formed at a position that vertically overlaps the coupling portion 1131 of the first part 110. The upper groove 123 may face the coupling portion 1131 of the first part 110. The coupling portion 1131 of the first part 110 may be partially inserted into the upper groove 123. The rear groove 124 may be formed at an opposite side of the upper groove 123. The rear groove 124 may be formed at a position that vertically overlaps the upper groove 123. A connecting hole 125 may vertically connect the upper groove 123 and the rear groove 124. The coupling portion 1131 of the first part 110, the upper groove 123, the connecting hole 125, and the rear groove 124 may be aligned vertically. The fastening member F may be inserted into the coupling portion 1131 of the first part 110, the upper groove 123, the connecting hole 125, and the rear groove 124. In this manner, the first part 110 may be coupled to the second part 120. A diameter of the rear groove 124 may be greater than a diameter of the connecting hole 125. A head of the fastening member F may be positioned in the rear groove 124, and a pin of the fastening member F may pass through the connecting hole 125. The pin of the fastening member F may pass through the connecting hole 125 to protrude to the upper groove 123 and to be coupled to the coupling portion 1131 disposed in the upper groove 123.

The second part 120 may include the supporter insertion grooves 121 and 122. The supporter insertion grooves 121 and 122 may be formed in the same surface as the surface in which the upper groove 123 is formed. The supporter insertion grooves 121 and 122 may face the roller body 113 of the first part 110. The first supporter 610 may be inserted into the supporter insertion grooves 121 and 122. The supporter insertion groove 121 and 122 may include a plurality of supporter insertion grooves 121 and 122. For example, the plurality of supporter insertion grooves 121 and 122 may include two supporter insertion grooves 121 and 122. However, the supporter insertion grooves are not limited thereto and may be provided in number corresponding to the number of the first supporter 610.

The supporter insertion grooves 121 and 122 may include a second left supporter insertion groove 121 and a second right supporter insertion groove 122 that are horizontally spaced apart from each other. The second left supporter insertion groove 121 may be located further to the left than the second right supporter insertion groove 122. The second right supporter insertion groove 122 may be located further to the right than the second left supporter insertion groove 121. The second left supporter insertion groove 121 may be formed on the left side of the upper groove 123, and the second right supporter insertion groove 122 may be formed on the right side of the upper groove 123. The second left supporter insertion groove 121 may be vertically aligned with the first left supporter insertion groove 1133. The second right supporter insertion groove 122 may be vertically aligned with the first right supporter insertion groove 1134. A lower end of the first left supporter 611 may be inserted into the second left supporter insertion groove 121. A lower end of the first right supporter 611 may be inserted into the second right supporter insertion groove 122.

The space 130 may be formed between the first part 110 and the second part 120. The space 130 may be formed between the lower surface of the roller body 113 and the upper surface of the second part 120. The space 130 may be formed between the first step portion 1132*a* and the second step portion 1132*b* of the first part 110. The space 130 may refer to a space defined by the lower surface of the roller body 113, the upper surface of the second part 120, the first step portion 1132*a*, and the second step portion 1132*b*. The first end 410 of the belt 400 may be inserted into the space 130.

Figure 13:
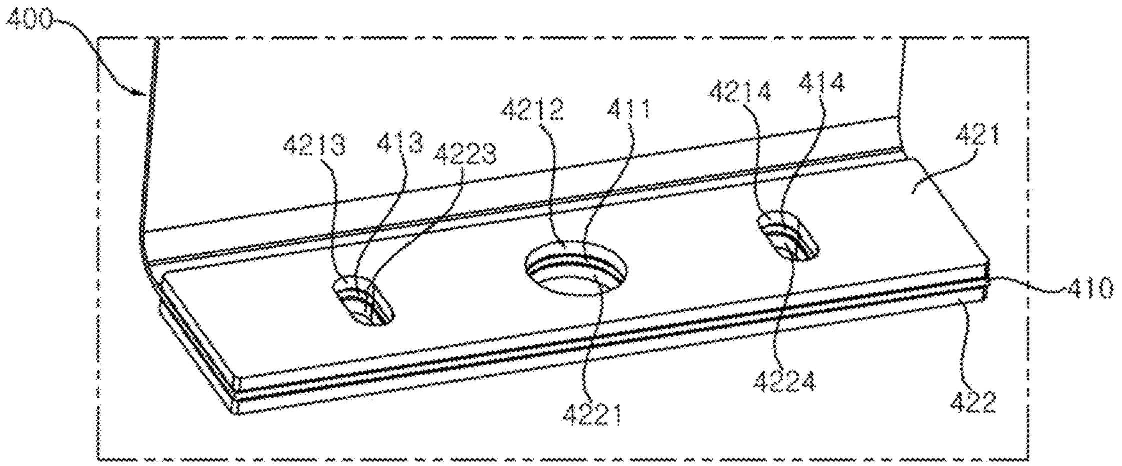
Figure 14:
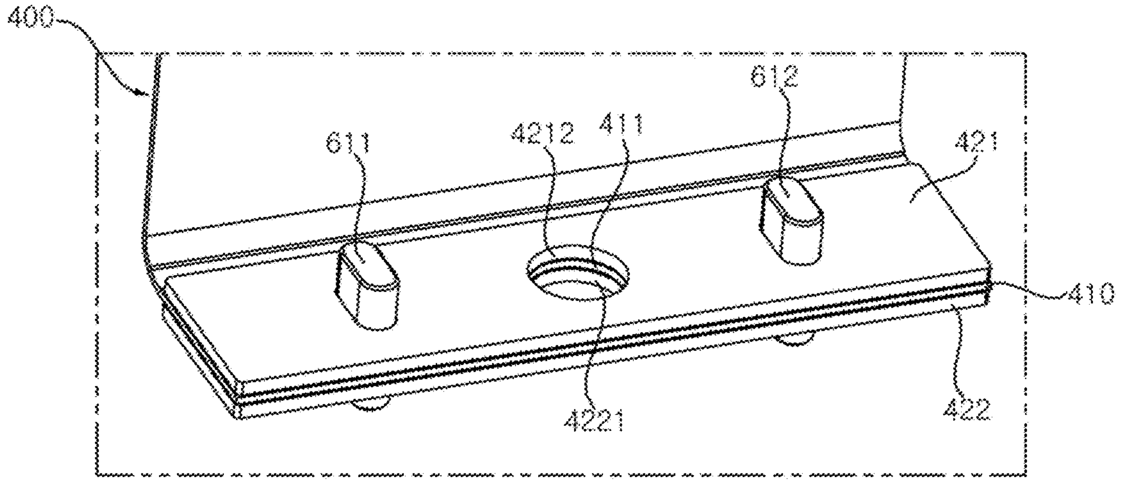

Referring to FIGS. 12, 13, and 14, the belt 400 may include the first end 410 fixed to the roller 100, and a second end 430 fixed to the display panel 11. The belt 400 may be stretched over the pulley 300. The belt 400 may be stretched over the pulley 300 at a position between the first end 410 and the second end 430. The belt 400 may have an opened curve shape in which the first end 410 and the second end 430 are not connected. The belt 400 may be made of a flexible material.

The first end 410 of the belt 400 may be fixed to the roller 100. The first end 410 of the belt 400 may be fixed between the first part 110 and the second part 120. The first end 410 of the belt 400 may be inserted into the space 130 formed between the first part 110 and the second part 120. The belt 400 may include a first surface facing the first part 110 and a second surface facing the second part 120. The second surface may be disposed on an opposite side of the first surface.

A first central hole 411 may be formed at the first end 410 of the belt 400. The first central hole 411 may be formed by vertically penetrating the first surface and the second surface of the first end 410 of the belt 400. The first central hole 411 may be formed at a position that aligns with the coupling portion 1311. The coupling portion 1311 may pass through the first central hole 411.

A first reinforcing plate 421 may be disposed on the first surface of the first end 410 of the belt 400. The first reinforcing plate 421 may have a shape corresponding to the first end 410 of the belt 400. The first reinforcing plate 421 may have a flat plate shape. The first reinforcing plate 421 may be attached to the first end 410 of the belt 400 with tape 423. The first reinforcing plate 421 may be made of a metal material. A second central hole 4212 may be formed in the first reinforcing plate 421. The second central hole 4212 may be vertically aligned with the first central hole 411 of the first end 410 of the belt 400. The coupling portion 1311 may pass through the second central hole 4212.

A second reinforcing plate 422 may be disposed on the second surface of the first end 410 of the belt 400. The second reinforcing plate 422 may have a shape corresponding to the first end 410 of the belt 400. The second reinforcing plate 422 may have a flat plate shape. The second reinforcing plate 422 may be attached to the first end 410 of the belt 400 with tape 424. The second reinforcing plate 422 may be made of a metal material. A third central hole 4221 may be formed in the second reinforcing plate 422. The third central hole 4221 may be vertically aligned with the first central hole 411 of the first end 410 of the belt 400. The third central hole 4221 may be vertically aligned with the second central hole 4212 of the first reinforcing plate 421. The coupling portion 1311 may pass through the third central hole 4221. That is, the first central hole 411, the second central hole 4212, and the third central hole 4221 may be aligned vertically, and may form a single hole through which the holes communicate with each other. The coupling portion 1311 may be inserted into the upper groove 123 by passing through the hole, through which the first central hole 411, the second central hole 4212, and the third central hole 4221 communicate with each other. The aforementioned fastening member F may be coupled to the coupling portion 1311. In this manner, the first end 410 of the belt 400 may be fixed to the roller 100.

The first reinforcing plate 421 may include a protrusion 4211 (see FIG. 11). The protrusion 4211 may protrude from the first reinforcing plate 421 toward the second reinforcing plate 422. The protrusion 4211 may include a plurality of protrusions 4211. For example, the plurality of protrusions 4211 may include a first left protrusion 4211*a*, a second left protrusion 4211*b*, a first right protrusion 4211*c*, and a second right protrusion 4211*d*. However, the plurality of protrusions are not limited thereto, and may include less than four protrusions or five or more protrusions. The left protrusions 4211*a* and 4211*b* may be formed on the left side of the second central hole 4212. The right protrusions 4211*c* and 4211*d* may be formed on the right side of the second central hole 4121. The first left protrusion 4211*a* may be disposed closer to the second central hole 4212*a* than the second left protrusion 4211*b*. The first right protrusion 4211*c* may be disposed closer to the second central hole 4121 than the second right protrusion 4211*d*.

A side hole 412 may be formed at the first end 410 of the belt 400. The side hole 412 may include a plurality of side holes 412. The side holes 412 may be provided in number corresponding to the protrusions 4211 of the first reinforcing plate 421. For example, the side hole 412 may include a first left side hole 4121, a second left side hole 4121, a first right hole 4123, and a second right hole 4124. The left holes 4121 and 4122 may be formed on the left side of the first central hole 411. The right holes 4123 and 4124 may be formed on the right side of the first central hole 411. The first left hole 4121 may be disposed closer to the first central hole 411 than the second left hole 4121. The first right hole 4123 may be disposed closer to the first central hole 411 than the second right hole 4124. The first left hole 4121 may be vertically aligned with the first left protrusion 4211*a*. The second left hole 4122 may be vertically aligned with the second left protrusion 4211*b*. The first right hole 4123 may be vertically aligned with the first left protrusion 4211*c*. The second right hole 4124 may be vertically aligned with the second left protrusion 4211*d*.

A coupling hole 4222 may be formed in the second reinforcing plate 422. The coupling hole 4222 may include a plurality of coupling holes 4222. The plurality of coupling holes 4222 may be provided in number corresponding to the number of the protrusions 4211 of the first reinforcing plate 421. For example, the coupling holes 4222 may include a first left coupling hole 4222*a*, a second left coupling hole 4222*b*, a first right coupling hole 4222*c*, and a second right coupling hole 4222*d*. The left coupling holes 4222*a* and 4222*b* may be formed on the left side of the third central hole 4221. The right coupling holes 4222*c* and 4222*d* may be formed on the right side of the third central hole 4221. The first left coupling hole 4222*a* may be located closer to the third central hole 4221 than the second left coupling hole 4222*b*. The first right coupling hole 4222*c* may be located closer to the third central hole 4221 than the second right coupling hole 4222*d*.

The first left coupling hole 4222*a* may be vertically aligned with the first left protrusion 4211*a* and the first left hole 4121. The second left coupling hole 4222*b* may be vertically aligned with the second left protrusion 4211*b* and the second left hole 4122. The first right coupling hole 4222*c* may be vertically aligned with the first right protrusion 4211*c* and the first right hole 4123. The second right coupling hole 4222*d* may be vertically aligned with the second right protrusion 4211*d* and the second right hole 4124. Accordingly, the first and second left protrusions 4211*a* and 4211*b* may pass through the first and second left holes 4121 and 4122, respectively, to be inserted into the first and second left coupling holes 4222*a* and 4222*b*. In addition, the first and second right protrusions 4211*c* and 4211*d* may pass through the first and second right holes 4123 and 4124, respectively, to be inserted into the first and second right coupling holes 4222*c* and 4222*d*. In this manner, the first end 410 of the belt 400, the first reinforcing plate 421, and the second reinforcing plate 422 may be firmly fixed.

Supporter insertion holes 413 and 414 may be formed at the first end 410 of the belt 400. The supporter insertion holes 413 and 414 may include a first left supporter insertion hole 413 formed on the left side of the first central hole 411. The supporter insertion holes 413 and 414 may include a first right supporter insertion hole 414 formed on the right side of the first central hole 411. The first left supporter insertion hole 413 may be formed between the first left hole 4121 and the second left hole 4122. The first right supporter insertion hole 414 may be formed between the second right hole 4123 and the second right hole 4124.

Supporter insertion holes 4213 and 4214 may be formed in the first reinforcing plate 421. The supporter insertion holes 4213 and 4214 may include a second left supporter insertion hole 4213 formed on the left side of the second central hole 4212. The supporter insertion holes 4213 and 4214 may include a second right supporter insertion hole 4214 formed on the right side of the second central hole 4212. The second left supporter insertion hole 4213 may be formed between the first left protrusion 4211*a* and the second left protrusion 4211*b*. The second right supporter insertion hole 4214 may be formed between the first right protrusion 4211*c* and the second right protrusion 4211*d*.

Supporter insertion holes 4223 and 4224 may be formed in the second reinforcing plate 422. The supporter insertion holes 4223 and 4224 may include a third left supporter insertion hole 4223 formed on the left side of the third central hole 4221. The supporter insertion holes 4223 and 4224 may include a third right supporter insertion hole 4224 formed on the right side of the third central hole 4221. The third left supporter insertion hole 4223 may be formed between the first left coupling hole 4222*a* and the second left coupling hole 4222*b*. The third right supporter insertion hole 4224 may be formed between the first right coupling hole 4222*c* and the second right coupling hole 4222*d*.

The second left supporter insertion hole 4213, the first left supporter insertion hole 413, and the third left supporter insertion hole 4223 may be vertically aligned. The second left supporter insertion hole 4213, the first left supporter insertion hole 413, and the third left supporter insertion hole 4223, communicating with each other, may form a single hole. The first left supporter 611 may pass through the second left supporter insertion hole 4213, the first left supporter insertion hole 413, and the third left supporter insertion hole 4223.

The second right supporter insertion hole 4214, the first right supporter insertion hole 414, and the third right supporter insertion hole 4224 may be vertically aligned. The second right supporter insertion hole 4214, the first right supporter insertion hole 414, and the third right supporter insertion hole 4224, communicating with each other, may form a single hole. The first right supporter 613 may pass through the second right supporter insertion hole 4214, the first right supporter insertion hole 414, and the third right supporter insertion hole 4224.

The first supporter 610 may fix the first end 410 of the belt 400 to the roller 100. The first supporter 610 may include a plurality of first supporters 610. For example, the plurality of first supporters 610 may include the first left supporter 611 and the first right supporter 612 that are horizontally spaced apart from each other. The first left supporter 611 may be disposed closer to the left side (not numbered) of the belt 400 than the first right supporter 612. The first right supporter 612 may be disposed closer to the right side (not numbered) of the belt 400 than the first left supporter 611.

The first left supporter 611 may pass through the first left supporter insertion hole 413 of the first end 410 of the belt 400. The first left supporter 611 may include an upper end (not numbered) that passes through the left supporter insertion holes 413, 4213, and 4223 to protrude to the upper side of the first reinforcing plate 421. The upper end (not numbered) of the first left supporter 611 may be inserted into the first left supporter insertion groove 1133 of the first part 110 of the roller 100 and fixed thereto. The first left supporter 611 may include a lower end (not numbered) that passes through the left supporter insertion holes 413, 4213, and 4223 to protrude to the lower side of the second reinforcing plate 422. The lower end (not numbered) of the first left supporter 611 may be inserted into the second left supporter insertion groove 121 of the second part 120 of the roller 100 and fixed thereto.

The first right supporter 612 may pass through the right supporter insertion holes 414, 4214, and 4224. The first right supporter 612 may include an upper end (not numbered) that passes through the right supporter insertion holes 414, 4214, and 4224 to protrude to the upper side of the first reinforcing plate 421. The upper end (not numbered) of the first right supporter 612 may be inserted into the first right supporter insertion groove 1134 of the first part 110 of the roller 100 and fixed thereto. The first right supporter 612 may include a lower end (not numbered) that passes through the right supporter insertion holes 414, 4214, and 4224 to protrude to the lower side of the second reinforcing plate 422. The lower end (not numbered) of the first right supporter 612 may be inserted into the second right supporter insertion groove 122 of the second part 120 of the roller 100 and fixed thereto. In this manner, the first supporter 610 may constrain a rotational degree of freedom of the first end 410 of the belt 400. Accordingly, it is possible to prevent the belt 400 from being offset (Of) in a certain direction and wound (see FIG. 10).

The first left supporter 611 and the first right supporter 612 may have the same shape. The first supporter 610 may have a solid cylindrical shape. The first supporter 610 may extend in a direction perpendicular to the rotating shaft 210 of the motor 200. The first supporter 610 may extend in a radial direction of the roller 100. A portion of the side surface of the first supporter 610 may be formed as a flat surface. When viewed from above, the first supporter 610 may have an elliptical shape. The left surface and the right surface of the first supporter 610 may be formed as flat surfaces. In this manner, it is possible to prevent the belt 400 from being offset to the left or to the right. Accordingly, it is possible to prevent the belt 400 from being offset (Of) in a certain direction and wound (see FIG. 10).

The left supporter insertion holes 413, 4213, and 4223 and the first and second left supporter insertion grooves 1133 and 121 may have the same shape as that of the first left supporter 611. The right supporter insertion holes 414, 4214, and 4224 and the first and second right supporter insertion grooves 1134 and 122 may have the same shape as that of the first right supporter 612.

Referring to FIGS. 9, 15, 16, 17, and 18, the second end 430 of the belt 400 may be fixed to the display panel 11. The second end 430 of the belt 400 may be fixed to the rear surface of the display panel 11. The second end 430 of the belt 400 may be fixed to the plate 14. The plate 14 may be coupled to the rear surface of the display panel 11. The second end 43 of the belt 400 may be fixed to the display panel 11 through the plate 14. The second end 430 of the belt 400 may include a front surface facing the display panel 11 and a rear surface disposed on an opposite side of the front surface and not facing the display panel 11.

A first through hole 431 may be formed at the second end 430 of the belt 400. The first through hole 431 may be formed by penetrating the front surface and the rear surface of the second end 430 of the belt 400 in the front-rear direction. The first through hole 431 may be formed at a position that aligns with a protruding portion 532 of a slider

500 which will be described later. The protruding portion 532 of the slider 500 may pass through the first through hole 431.

A third reinforcing plate 441 may be disposed on the front surface of the second end 430 of the belt 400. The third reinforcing plate 441 may have a shape corresponding to the second end 430 of the belt 300. The third reinforcing plate 441 may have a flat plate shape. The third reinforcing plate 441 may be made of a metal material. The third reinforcing plate 441 may be attached to the front surface of the second end 430 of the belt 400 with tape 443. A second through hole 4411 may be formed in the third reinforcing plate 441. The second through hole 4411 may be aligned with the first through hole 431 of the second end 430 of the belt 400 in the front-rear direction. The protruding portion 532 of the slider 500 may pass through the second through hole 4411.

A fourth reinforcing plate 442 may be disposed on the rear surface of the second end 430 of the belt 400. The fourth reinforcing plate 442 may have a shape corresponding to the second end 430 of the belt 400. The fourth reinforcing plate 442 may have a flat plate shape. The fourth reinforcing plate 442 may be attached to the rear surface of the second end 430 of the belt 400 with tape 444. A third through hole 4421 may be formed in the fourth reinforcing plate 442. The third through hole 4421 may be aligned with the first through hole 431 of the second end 430 of the belt 400 in the front-rear direction. The third through hole 4421 may be aligned with the second through hole 4411 of the third reinforcing plate 441 in the front-rear direction. The second through hole 4411, the first through hole 431, and the third through hole 4421 may be aligned in the front-rear direction and may form a single hole through which the through holes communicate with each other. The protruding portion 532 of the slider 500 may pass through the hole through which the second through hole 4411, the first through hole 431, and the third through hole 4421 communicate with each other.

The fourth reinforcing plate 442 may have a protrusion 4422. The protrusion 4422 may protrude from the fourth reinforcing plate 442 toward the first reinforcing plate 441. The protrusion 4422 may include a plurality of protrusions 4422. For example, the plurality of protrusions 4422 may include a third left protrusion **4422*a*, a fourth left protrusion 4422*b*, a third right protrusion 4422*c*, and a fourth right protrusion 4422*d*. However, the plurality of protrusions are not limited thereto, and may include less than four protrusions or five or more protrusions. The left protrusions 4422*a* and 4422*b* may be formed on the left side of the third through hole 4421. The right protrusions 4422*c* and 4422*d* may be formed on the right side of the third through hole 4421. The third left protrusion 4422*a* may be disposed closer to the third through hole 4421 than the fourth left protrusion 4422*b*. The third right protrusion 4422*c* may be disposed closer to the third through hole 4421 than the fourth right protrusion 4422*d***.

A side hole 432 may be formed at the second end 430 of the belt 400. The side hole 432 may include a plurality of side holes 432. The side holes 432 may be provided in number corresponding to the number of protrusions 4422 of the fourth reinforcing plate 442. For example, the side hole 432 may include a third left hole 4321, a fourth left hole 4322, a third right hole 4323, and a fourth right hole 4324. The left holes 4321 and 4322 may be formed on the left side of the first through hole 431. The right holes 4323 and 4324 may be formed on the right side of the first through hole 431. The third left hole 4321 may be disposed closer to the first through hole 431 than the fourth left hole 4322. The third right hole 4323 may be disposed closer to the first through hole 431 than the fourth right hole 4324. The third left hole 4321 may be aligned with the third left protrusion **4422*a* in the front-rear direction. The fourth left hole 4322 may be aligned with the fourth left protrusion 4422*b* in the front-rear direction. The third right hole 4323 may be aligned with the third right protrusion 4422*c* in the front-rear direction. The fourth right hole 4324 may be aligned with the fourth right protrusion 4422*d*** in the front-rear direction.

A coupling hole 4412 may be formed in the third reinforcing plate 441. The coupling hole 4412 may include a plurality of coupling holes 4412. The plurality of coupling holes 4412 may be provided in number corresponding to the number of protrusions 4422 of the fourth reinforcing plate 442. For example, the coupling holes 4412 may include a third left coupling hole **4412*a*, a fourth left coupling hole 4412*b*, a third right coupling hole 4412*c*, and a fourth right coupling hole 4412*d*. The left coupling holes 4412*a* and 4412*b* may be formed on the left side of the second through hole 4411. The right coupling holes 4412*c* and 4412*d* may be formed on the right side of the second through hole 4411. The third left coupling hole 4412*a* may be located closer to the second through hole 4411 than the fourth left coupling hole 4412*b*. The third right coupling hole 4412*c* may be located closer to the second through hole 4411 than the fourth right coupling hole 4412*d***.

The third left coupling hole **4412*a* may be aligned with the third left protrusion 4422*a* and the third left hole 4321 in the front-rear direction. The fourth left coupling hole 4412*b* may be aligned with the fourth left protrusion 4422*b* and the fourth left hole 4422 in the front-rear direction. The third right coupling hole 4412*c* may be aligned with the third right protrusion 4422*c* and the third right hole 4423 in the front-rear direction. The fourth right coupling hole 4412*d* may be aligned with the fourth right protrusion 4422*d* and the fourth right hole 4324 in the front-rear direction. Accordingly, the third and fourth left protrusions 4422*a* and 4422*b* may pass through the third and fourth left holes 4321 and 4322, respectively, to be inserted into the third and fourth left coupling holes 4412*a* and 4412*b*. In addition, the third and fourth right protrusions 4422*c* and 4422*d* may pass through the third and fourth right holes 4323 and 4324, respectively, to be inserted into the third and fourth right coupling holes 4412*c* and 4412*d*. In this manner, the second end 430 of the belt 400, the third reinforcing plate 431, and the fourth reinforcing plate 432** may be firmly secured.

Figure 15:
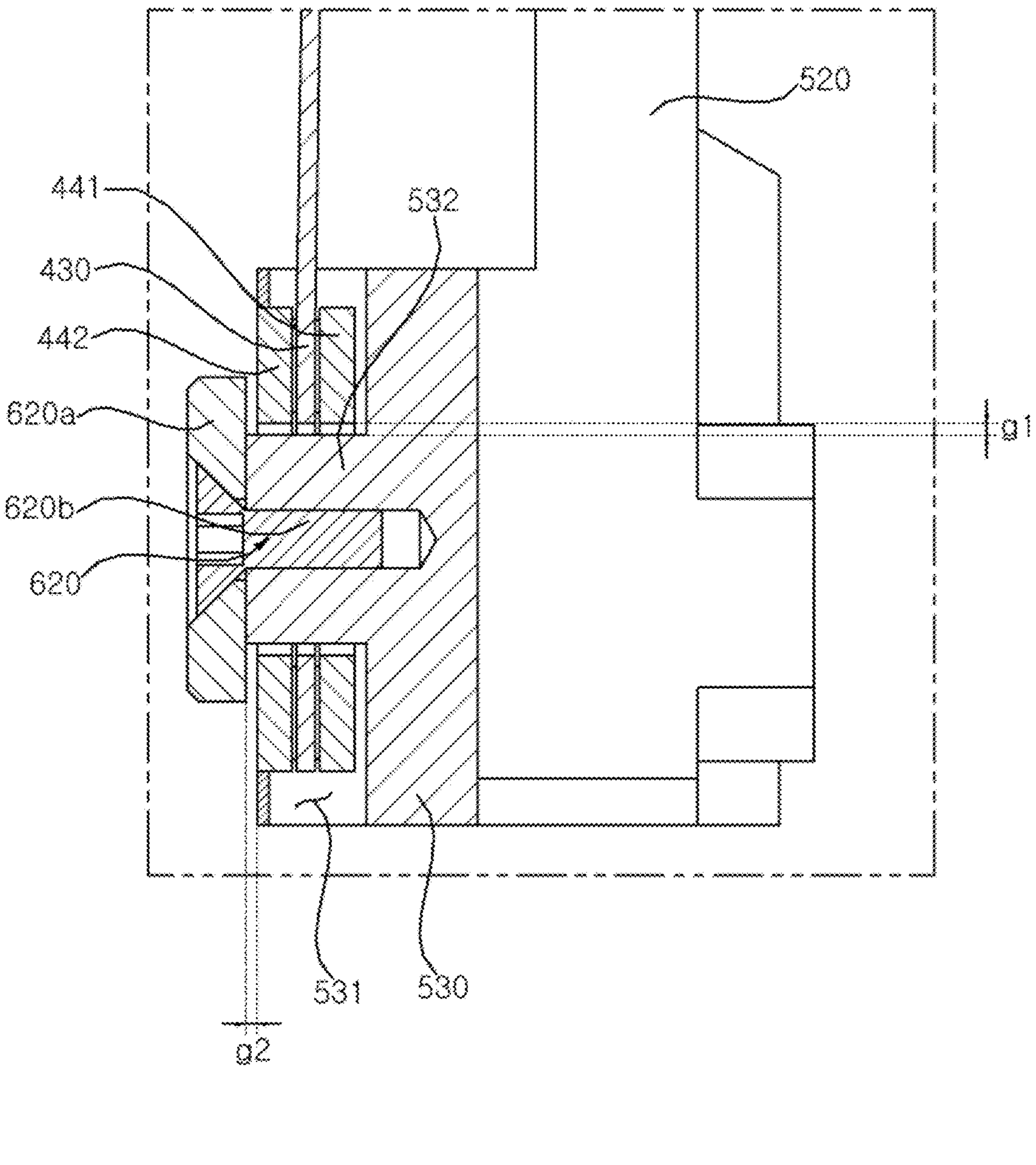
Figure 16:
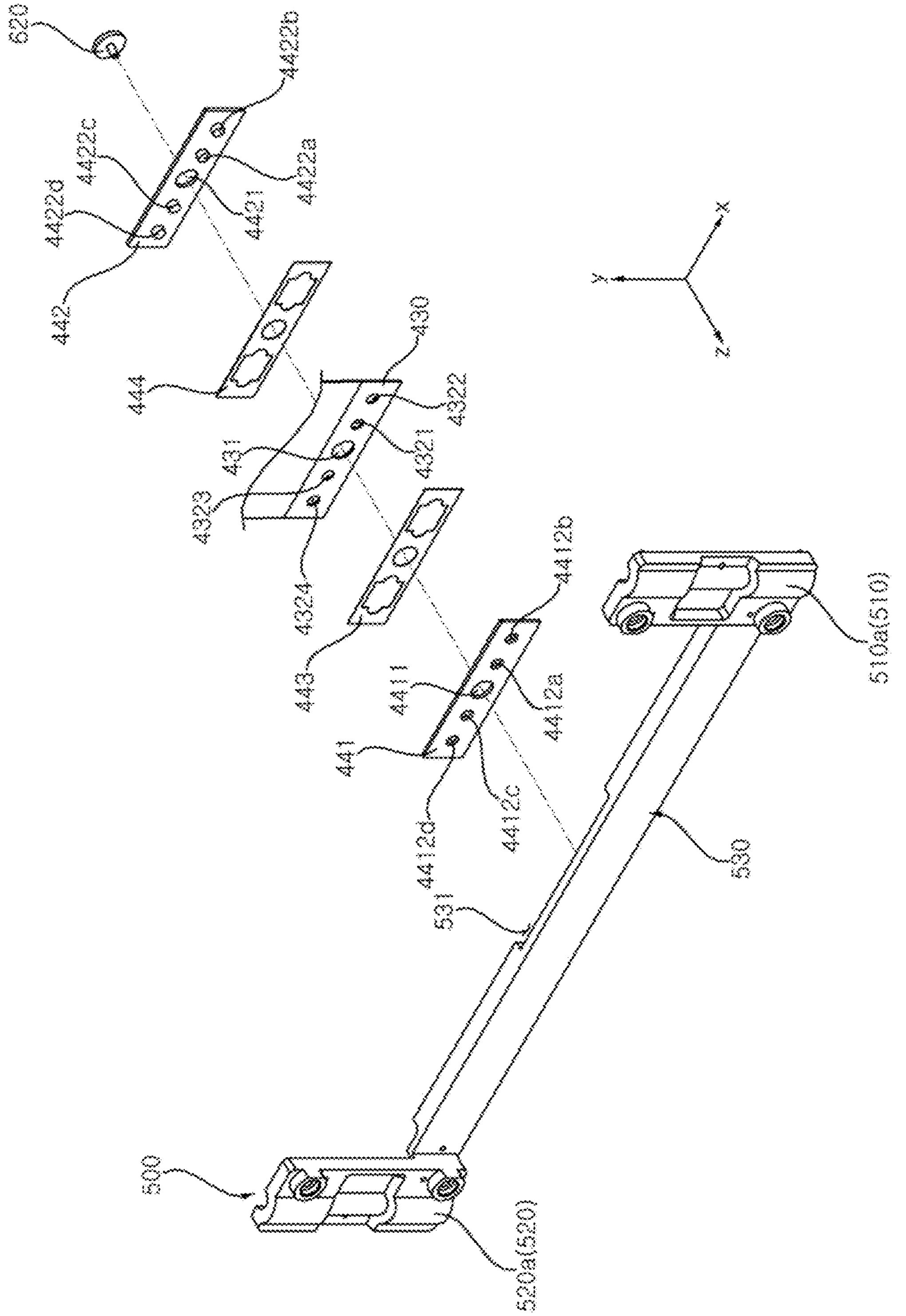
Figure 17:
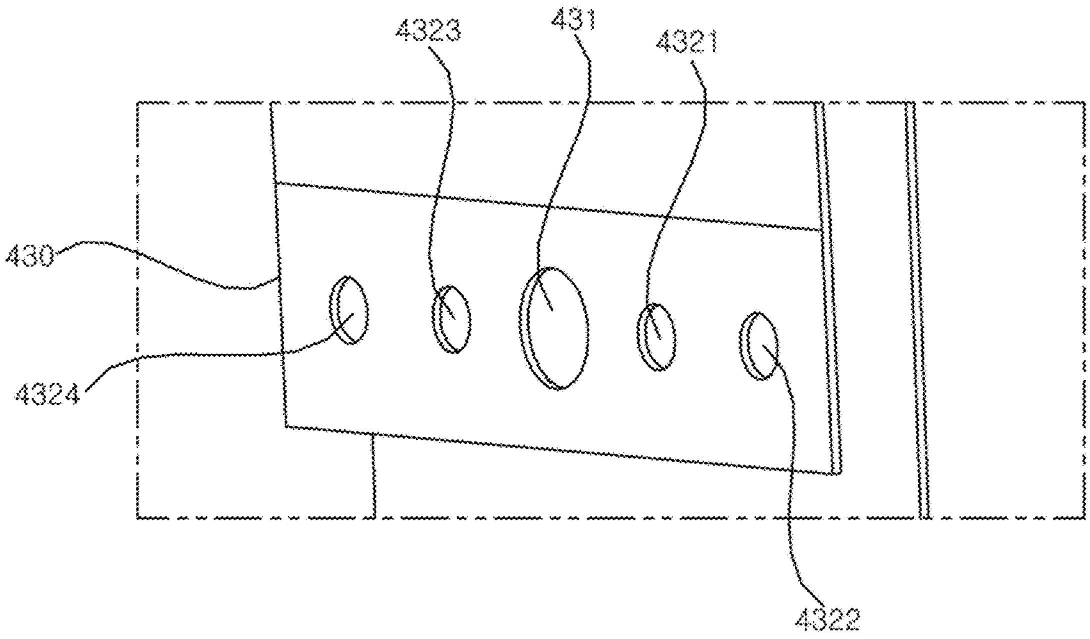
Figure 18:
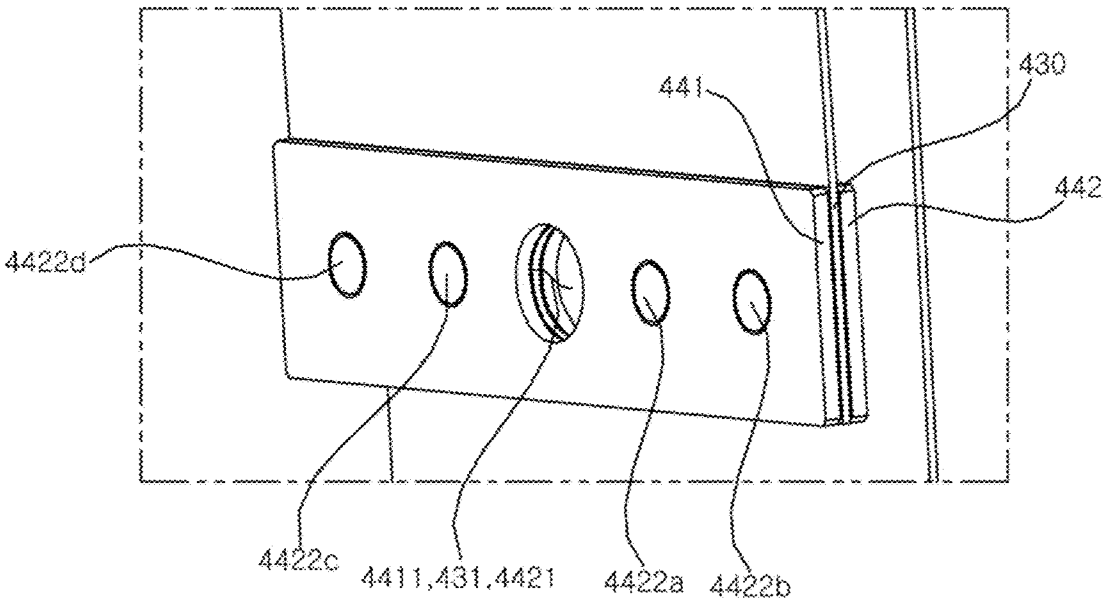

Referring to FIGS. 9, 15, and 16, the slider 500 may be disposed between the display panel 11 and the second end 430 of the belt 400, and may be coupled to the display panel 11 and the second end 430 of the belt 400. The slider 500 may be disposed between the plate 14 and the second end 430 of the belt 400, and may be coupled to the plate 14 and the second end 430 of the belt 400. A front surface of the slider 400 that faces the display panel 11 may be coupled to the rear surface of the display panel 11 or the plate 14. The second end 430 of the belt 400 may be coupled to a rear surface of the slider 400.

The slider 500 may include a first block 510. The first block 510 may be coupled to a first shaft 61. The first block 510 may move together with movement of the belt 400, and may move along the first shaft 61. The first block 510 may include a first front block **510*a* and a first rear block (not shown). The first rear block (not shown) may be disposed behind the first front block 510*a*. The first rear block (not shown) may be coupled to the rear of the first front block 510*a***.

A portion of the first shaft 61 may be disposed between the first front block **510*a*** and the first rear block (not shown).

A first bushing 61*a* may be inserted and fixed between the first front block 510*a* and the first rear block (not shown). The first bushing 61*a* may be formed between the first front block 510*a* and the first rear block (not shown), and may be disposed in a groove (not numbered) surrounding an outer peripheral surface of the first bushing 61*a*. The first bushing 61*a* may include a plurality of first bushings 61*a*. For example, the plurality of first bushings 61*a* may include a pair of first bushings 61*a* which are spaced apart from each other in a longitudinal direction of the first shaft 61.

The slider 500 may include a second block 520. The second block 520 may be coupled to a second shaft 62. The second block 520 may move together with movement of the belt 400, and may move along the second shaft 62. The second block 520 may include a second front block 520*a* and a second rear block (not shown). The second rear block (not shown) may be disposed behind the second front block 520. The second rear block (not shown) may be coupled to the rear of the second front block 520*a*.

A portion of the second shaft 62 may be disposed between the second front block 520*a* and the second rear block (not shown). A second bushing 62*a* may be inserted and fixed between the second front block 520*a* and the second rear block (not shown). The second bushing 62*a* may be formed between the second front block 520*a* and the second rear block (not shown), and may be disposed in a groove (not numbered) surrounding an outer peripheral surface of the second bushing 62*a*. The second bushing 62*a* may include a plurality of second bushings 62*a*. For example, the plurality of second bushings 62*a* may include a pair of second bushings 62*a* which are spaced apart from each other in a longitudinal direction of the second shaft 62.

Accordingly, the blocks 510 and 520 may perform a stable linear reciprocating motion along the shafts 61 and 62.

The first front block 510*a* of the first block 510 may be coupled or fixed to the rear surface of the display panel 11. The first front block 510*a* of the first block 510 may be coupled or fixed to the rear surface of the plate 14. The second front block 520*a* of the second block 520 may be coupled or fixed to the rear surface of the display panel 11. The second front block 520*a* of the second block 520 may be coupled or fixed to the rear surface of the plate 14. Accordingly, when the motor 200 is driven, the plate 14, the display unit 10, and the T-CON board TC may be raised or lowered.

The slider 500 may include an extension part 530. The extension part 530 may be disposed between the first block 510 and the second block 520. The extension part 530 may connect the first block 510 and the second block 520. The extension part 530 may connect a lower end of the first block 510 and a lower end of the second block 520. The extension part 530 may face the plate 14. The extension part 530 may be disposed behind the first front block 510*a* and the second front block 520*a*. In this manner, a separation space may be formed between the extension part 530 and the plate 14, and the T-CON board TC may be fixed to the plate 14 without interfering with the slider 500.

The second end 430 of the belt 400 may be coupled to the extension part 530. The second end 430 of the belt 400 may be coupled to the rear surface of the extension part 530. The extension part 530 may include a groove 531 formed in the rear surface thereof. The groove 531 may be formed at a position facing the belt 400. The groove 531 may have a width corresponding to a width of the belt 400 in a horizontal direction, or may have a width greater than the width of the belt 400 in the horizontal direction. Accordingly, the second end 430 of the belt 400 may be accommodated in the groove 531.

The extension part 530 may include a protruding portion 532. The protruding portion 532 may be formed in the groove 531. The protruding portion 532 may protrude from the groove 531 toward the second end 430 of the belt 400. The protruding portion 532 may be aligned with the first through hole 431 of the second end 430 of the belt 400. The protruding portion 532 may pass through the second through hole 4411 of the third reinforcing plate 441, the first through hole 431 of the second end 430 of the belt 400, and the third through hole 4421 of the fourth reinforcing plate 442. The protruding portion 532 may be inserted into the through holes 4411, 431, and 4421, and may have a rear end that protrudes with respect to the through holes 4411, 431, and 4421. The rear end of the protruding portion 532 may protrude rearward of the fourth reinforcing plate 442.

The second supporter 620 may couple the second end 430 of the belt 400 to the slider 500. The second supporter 620 may be fixed to the protruding portion 532. For example, the second supporter 620 may be a fastening member such as a screw. The second supporter 620 may include a head 620*a* and a pin 620*b* extending from the head 620*a*. The head 620*a* of the second supporter 620 may have a diameter greater than a maximum diameter of the protruding portion 532. The head 620*a* of the second supporter 620 may have a diameter greater than the diameter of the through holes 4411, 431, and 4421. Accordingly, the head 620*a* of the second supporter 620 may contact the rear end of the protruding portion 532, and may not be inserted into the through holes 4411, 431, and 4421. The pin 620*b* of the second supporter 620 may be inserted into the protruding portion 532. In this manner, the second supporter 620 may couple the second end 430 of the belt 400 to the slider 500.

The second supporter 620 may have a circular cross-section. The head 620*a* of the second supporter 620 may have a circular cross-section.

The protruding portion 532 may be spaced apart from the through holes 4411, 431, and 4421 by a predetermined distance g1 (see FIG. 15). The head 620*a* of the second supporter 620 may be spaced apart from the third reinforcing plate 441 by a predetermined distance g2 (see FIG. 15). A depth of the groove 531 in the front-rear direction may be greater than a sum of widths of the second end 430 of the belt 400, the third reinforcing plate 441, and the fourth reinforcing plate 442. Accordingly, the second end 430 of the belt 400 may have a rotational degree of freedom.

Figure 19:
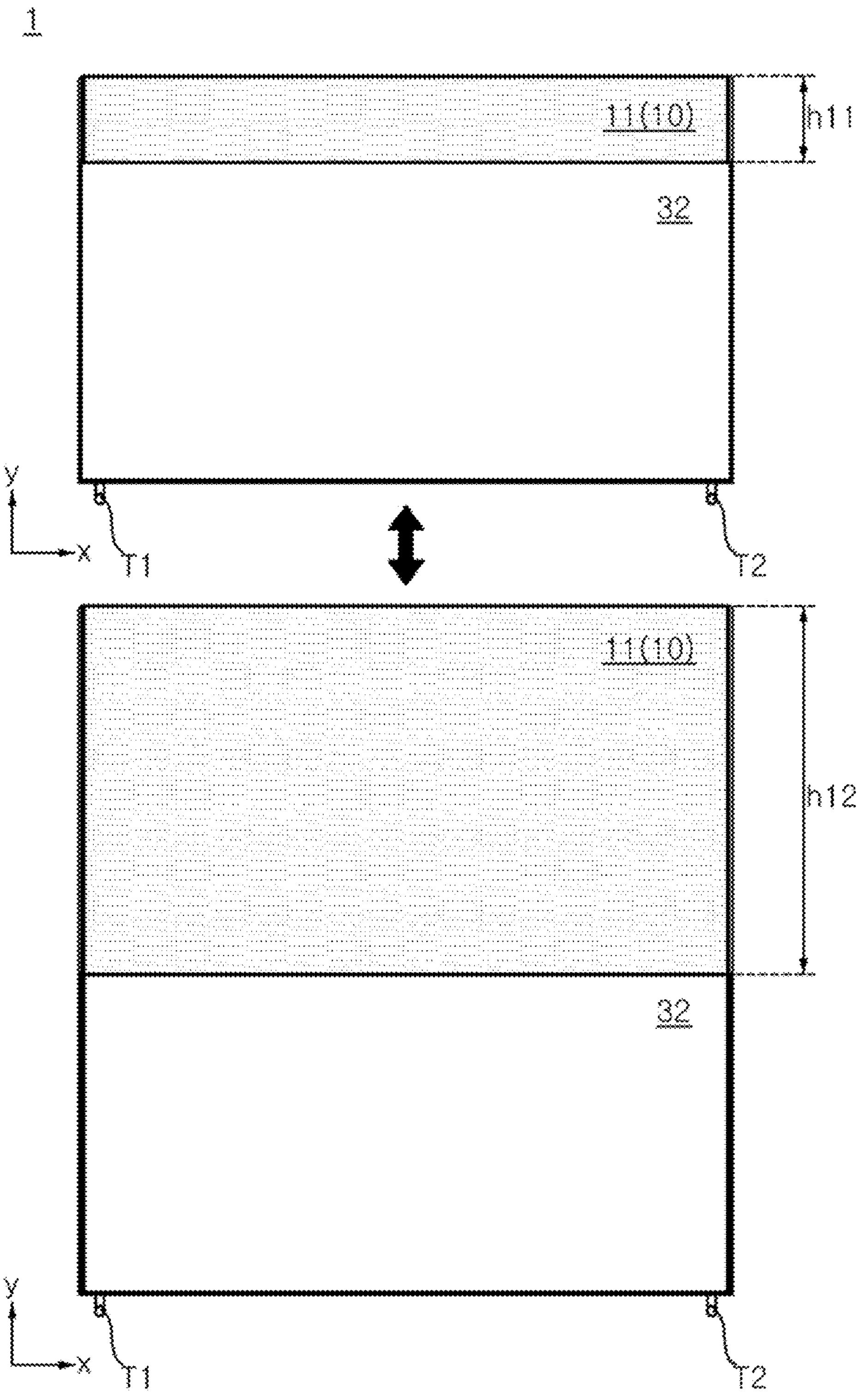

Referring to FIGS. 1 and 19, the display panel 11 may move upward and downward at the rear of the front case 32. While moving downward, the display panel 11 may be gradually covered by the front case 32. While moving upward, the display panel 11 may be gradually exposed to the front side. For example, a minimum height of the display panel 11 that is exposed to the front side may range from 0 to h11. For example, a maximum height of the display panel 11 that is exposed to the front side may be h12.

When the motor 200 is driven, the motor 200 may rotate the roller 100 in a first rotation direction. When the roller 100 rotates in the first rotation direction, the belt 400 may be wound around the roller 100. When the belt 400 is wound around the roller 100, the second end 430 of the belt 400 may be raised. When the second end 430 of the belt 400 is raised, the slider 500 fixed to the second end 430 of the belt 400 and the display panel 11 fixed to the slider 500 may be raised. In this case, the front surface of the display panel 11 may be opened relative to the front case 32.

When the motor 200 stops operation, the roller 100 may not rotate. In this case, the display panel 11 may be lowered by gravity. Alternatively, the motor 200 may rotate the roller 100 in a second rotation direction which is an opposite direction of the first rotation direction. When the roller 100 rotates in the second rotation direction, the belt 400 may be unwound from the roller 100. When the belt 400 is unwound from the roller 100, the second end of the belt 400 may be lowered. When the second end 430 of the belt 400 is lowered, the slider 500 fixed to the second end 430 of the belt 400 and the display panel 11 fixed to the slider 500 may be lowered. In this case, the front surface of the display panel 11 may be covered by the front case 32.

Referring to FIGS. 1 to 19, a display device according to an embodiment of the present disclosure includes: a display panel 11; a frame 20 including a first frame 24 disposed adjacent to a first side of the display panel 11, and a second frame 23 disposed adjacent to a second side of the display panel 11; and a driving module 60 configured to move the display panel 11 in a direction in which the first frame 24 and the second frame 23 are spaced apart from each other, wherein the driving module 60 includes: a roller 100 coupled to the first frame 24; a pulley 300 coupled to the second frame 23; a motor 200 configured to provide torque to the roller 100; and a belt 400 having a first end 410 fixed to the roller 100 and a second end 430 fixed to the display panel 11, wherein the belt 400 is stretched over the pulley 300 at a position between the first end 410 and the second end 430 of the belt 400.

The belt 400 may have an opened curve shape in which the first end 410 and the second end 430 are not connected.

The roller 100 may include a first part 110 coupled to a rotating shaft 210 of the motor 200 to rotate therewith, and a second part 120 coupled to the first part 110 to rotate together with the first part 110, wherein the first end 410 of the belt 400 may be fixed between the first part 110 and the second part 120.

The first end 410 of the belt 400 may include a first surface facing the first part 110 and a second surface facing the second part 120, wherein a first reinforcing plate 421 may be attached to the first surface of the first end 410 of the belt 400, and a second reinforcing plate 422 may be attached to the second surface of the first end 410 of the belt 400.

The first reinforcing plate 421 may include a protrusion 4211 protruding toward the second reinforcing plate 9422, and the second reinforcing plate 422 may include a coupling hole 4222 formed at a position corresponding to the protrusion 4211, wherein the protrusion 4211 of the first reinforcing plate 421 may pass through the first end 410 of the belt 400 to be inserted into the coupling hole 4222 of the second reinforcing plate 422.

The display device may include a first supporter 610 fixing the first end 410 of the belt 400 to the roller 100, the first supporter 610 extending in a direction perpendicular to a rotation axis of the roller 100, wherein an upper end of the first supporter 610 may be fixed to the first part 110, and a lower end of the first supporter 610 may be fixed to the second part 120.

The first supporter 610 may be provided as a solid cylinder, and a portion of a side surface of the first supporter 610 may be formed as a flat surface.

The first supporter 610 may include a first left supporter 611 and a first right supporter 612 that are spaced apart from each other, wherein the first left supporter 611 may be disposed closer to a left side of the belt 400 than the first right supporter 612, and the first right supporter 612 may be disposed closer to a right side of the belt 400 than the first left supporter 611.

The second end 430 of the belt 400 may include a front surface facing the display panel 11, and a rear surface disposed on an opposite side of the front surface and not facing the display panel 11, wherein a third reinforcing plate 441 may be attached to the front surface of the second end 430 of the belt 400, and a fourth reinforcing plate 442 may be attached to the rear surface of the second end 430 of the belt 400.

The display device may include a slider 500 disposed between the display panel 11 and the second end 430 of the belt 400 and coupled to the display panel 11 and the second end 430 of the belt 400, and a second supporter 620 coupled to the slider 500 by passing through a through hole 421 formed in a central region of the second end 430 of the belt 400, wherein the second supporter 620 may be spaced apart from an inner circumferential surface of the through hole 431.

The slider 500 may include: a groove 531 to which the second end 430 of the belt 400 is coupled, the groove 531 formed in a rear surface of the slider 500; and a protruding portion 532 protruding from the groove 531 toward the second end 430 of the belt 400, the protruding portion 532 passing through the through hole 431, wherein the protruding portion 532 may be spaced apart from the inner circumferential surface of the through hole 431, and the second supporter 620 may be fixed to the protruding portion 532.

The second supporter 620 may have a circular cross-section.

The belt 400 may be made of a flexible material.

A rotation axis of the roller 100 may be parallel to the rotating shaft 210 of the motor 200, and may be perpendicular to a moving direction of the display panel 11.

The display device may include a front case 32 disposed at a front of the display panel 11, wherein the display panel 11 may be raised or lowered, and may have a front surface that is opened and closed by the front case 32, wherein when the belt 400 is wound around the roller 100, the second end 430 of the belt 400 is raised to move the display panel 11 upward, and when the belt 400 is unwound from the roller 100, the second end 430 of the belt 400 is lowered to move the display panel 11 downward.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:

a display panel;

a frame including a first frame disposed adjacent to a first side of the display panel, and a second frame disposed adjacent to a second side of the display panel; and a driving module configured to move the display panel in a direction in which the first frame and the second frame are spaced apart from each other, wherein the driving module comprises:

a roller coupled to the first frame;

a pulley coupled to the second frame;

a motor configured to provide torque to the roller; and a belt having a first end fixed to the roller and a second end fixed to the display panel, wherein the belt is stretched over the pulley at a position between the first end and the second end of the belt, wherein the roller comprises a first part coupled to a rotating shaft of the motor to rotate therewith, and a second part coupled to the first part to rotate together with the first part, and wherein the first end of the belt is fixed between the first part and the second part.

2. The display device of claim 1, wherein the belt has an opened curve shape in which the first end and the second end are not connected.

3. The display device of claim 1, wherein the first end of the belt comprises a first surface facing the first part and a second surface facing the second part, wherein a first reinforcing plate is attached to the first surface of the first end of the belt, and a second reinforcing plate is attached to the second surface of the first end of the belt.

4. The display device of claim 3, wherein the first reinforcing plate comprises a protrusion protruding toward the second reinforcing plate, and the second reinforcing plate comprises a coupling hole formed at a position corresponding to the protrusion, wherein the protrusion of the first reinforcing plate passes through the first end of the belt to be inserted into the coupling hole of the second reinforcing plate.

5. The display device of claim 1, further comprising a first supporter fixing the first end of the belt to the roller, the first supporter extending in a direction perpendicular to a rotation axis of the roller, wherein an upper end of the first supporter is fixed to the first part, and a lower end of the first supporter is fixed to the second part.

6. The display device of claim 5, wherein the first supporter is provided as a solid cylinder, and a portion of a side surface of the first supporter is formed as a flat surface.

7. The display device of claim 5, wherein the first supporter comprises a first left supporter and a first right supporter that are spaced apart from each other, wherein the first left supporter is disposed closer to a left side of the belt than the first right supporter, and the first right supporter is disposed closer to a right side of the belt than the first left supporter.

8. The display device of claim 1, wherein the second end of the belt comprises a front surface facing the display panel, and a rear surface disposed on an opposite side of the front surface and not facing the display panel, wherein a third reinforcing plate is attached to the front surface of the second end of the belt, and a fourth reinforcing plate is attached to the rear surface of the second end of the belt.

9. The display device of claim 8, further comprising a slider disposed between the display panel and the second end of the belt and coupled to the display panel and the second end of the belt, and a second supporter coupled to the slider by passing through a through hole formed in a central region of the second end of the belt, wherein the second supporter is spaced apart from an inner circumferential surface of the through hole.

10. The display device of claim 9, wherein the slider comprises:

a groove to which the second end of the belt is coupled, the groove formed in a rear surface of the slider; and a protrusion protruding from the groove toward the second end of the belt, the protrusion passing through the through hole, wherein the protrusion is spaced apart from the inner circumferential surface of the through hole, and the second supporter is fixed to the protrusion.

11. The display device of claim 9, wherein the second supporter has a circular cross-section.

12. The display device of claim 1, wherein the belt is made of a flexible material.

13. The display device of claim 1, wherein a rotation axis of the roller is parallel to the rotating shaft of the motor, and is perpendicular to a moving direction of the display panel.

14. The display device of claim 1, further comprising a front case disposed at a front of the display panel, wherein the display panel is raised or lowered, and has a front surface that is opened and closed by the front case, wherein when the belt is wound around the roller, the second end of the belt is raised to move the display panel upward, and when the belt is unwound from the roller, the second end of the belt is lowered to move the display panel downward.

* * * * *